United States Patent
Heidemann et al.

(10) Patent No.: US 11,022,692 B2
(45) Date of Patent: *Jun. 1, 2021

(54) TRIANGULATION SCANNER HAVING FLAT GEOMETRY AND PROJECTING UNCODED SPOTS

(71) Applicant: FARO Technologies, Inc., Lake Mary, FL (US)

(72) Inventors: Rolf Heidemann, Stuttgart (DE); Mark Brenner, Asperg (DE); Simon Raab, Santa Barbara, CA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 117 days.

This patent is subject to a terminal disclaimer.

(21) Appl. No.: 15/784,437

(22) Filed: Oct. 16, 2017

(65) Prior Publication Data

US 2018/0321383 A1 Nov. 8, 2018

Related U.S. Application Data

(60) Provisional application No. 62/502,065, filed on May 5, 2017.

(51) Int. Cl.

| | |
|---|---|
| *G01S 17/66* | (2006.01) |
| *G01B 11/00* | (2006.01) |
| *H04N 13/296* | (2018.01) |
| *G01S 17/87* | (2020.01) |
| *G01B 11/25* | (2006.01) |
| *G06T 7/593* | (2017.01) |

(Continued)

(52) U.S. Cl.
CPC ............ *G01S 17/66* (2013.01); *G01B 11/002* (2013.01); *G01B 11/2513* (2013.01); *G01B 11/2545* (2013.01); *G01S 17/87* (2013.01); *G01S 17/89* (2013.01); *G06T 7/521* (2017.01); *G06T 7/593* (2017.01); *H04N 13/254* (2018.05); *H04N 13/271* (2018.05); *H04N 13/296* (2018.05); *G06T 2207/10028* (2013.01); *G06T 2207/30244* (2013.01)

(58) Field of Classification Search
CPC ... G01S 17/66; G01B 11/002; H04N 13/0239; H04N 13/0296; G06T 2207/10028
USPC ........................................................ 348/47
See application file for complete search history.

(56) References Cited

U.S. PATENT DOCUMENTS

| | | |
|---|---|---|
| 5,589,942 A | 12/1996 | Gordon |
| 8,830,485 B2 | 9/2014 | Woloschyn |

(Continued)

OTHER PUBLICATIONS

Invitation to Pay Additional Fees and Partial International Search for Application No. PCT/US2018/028831 dated Jul. 10, 2018 (31 pgs).

(Continued)

*Primary Examiner* — On S Mung
(74) *Attorney, Agent, or Firm* — Cantor Colburn LLP

(57) ABSTRACT

A projector projects an uncoded pattern of uncoded spots onto an object, which is imaged by a first camera and a second camera, 3D coordinates of the spots on the object being determined by a processor based on triangulation, the processor further determining correspondence among the projected and imaged spots based at least in part on a nearness of intersection of lines drawn from the projector and image spots through their respective perspective centers.

20 Claims, 25 Drawing Sheets

(51) Int. Cl.
*G01S 17/89* (2020.01)
*H04N 13/254* (2018.01)
*G06T 7/521* (2017.01)
*H04N 13/271* (2018.01)

(56) References Cited

U.S. PATENT DOCUMENTS

| | | |
|---|---|---|
| 8,970,823 B2 | 3/2015 | Heidemann et al. |
| 9,115,986 B2 | 8/2015 | Heidemann et al. |
| 9,217,637 B2 | 12/2015 | Heidemann et al. |
| 9,599,455 B2 | 3/2017 | Heidemann et al. |
| 9,602,811 B2 | 3/2017 | Hillebrand et al. |
| 9,671,221 B2 | 6/2017 | Ruhland et al. |
| 9,693,040 B2 | 6/2017 | Hillebrand et al. |
| 9,769,463 B2 | 9/2017 | Hillebrand et al. |
| 2014/0168379 A1* | 6/2014 | Heidemann ........ G01B 11/2513 348/47 |
| 2014/0168380 A1* | 6/2014 | Heidemann ............ G01B 11/25 348/47 |
| 2015/0015701 A1 | 1/2015 | Yu |
| 2015/0042759 A1 | 2/2015 | Heidemann et al. |
| 2015/0254819 A1 | 9/2015 | Hara |
| 2016/0073091 A1 | 3/2016 | Hillebrand et al. |

OTHER PUBLICATIONS

International Search Report and Written Opinion for International Application No. PCT/US2018/028831dated Sep. 5, 2018; (19 pgs).

\* cited by examiner

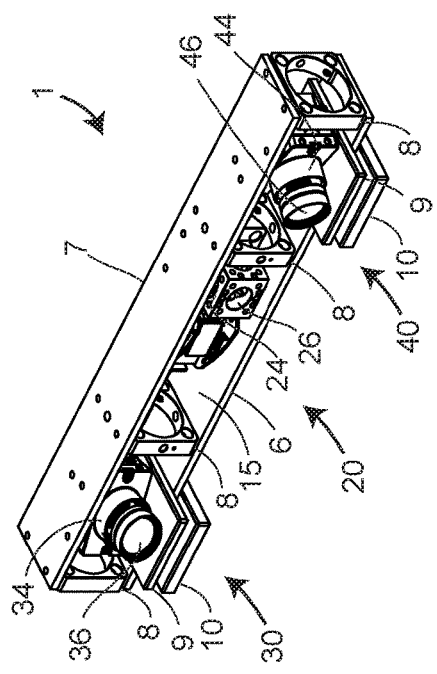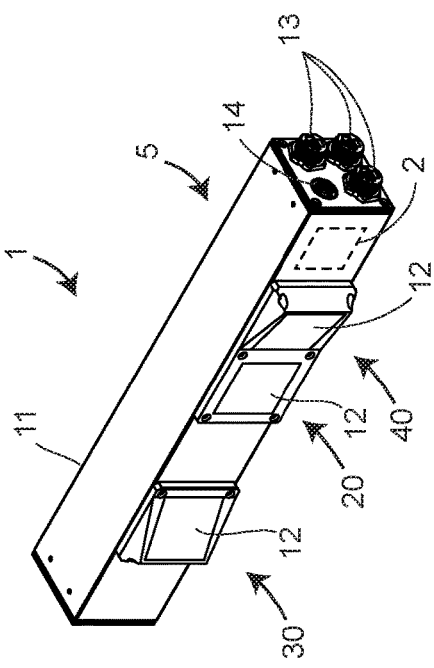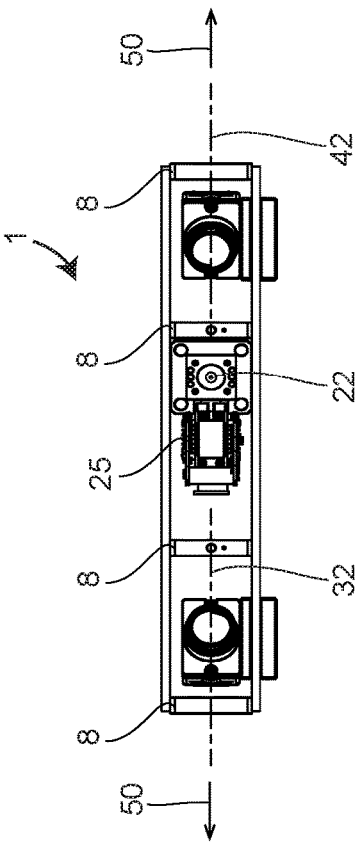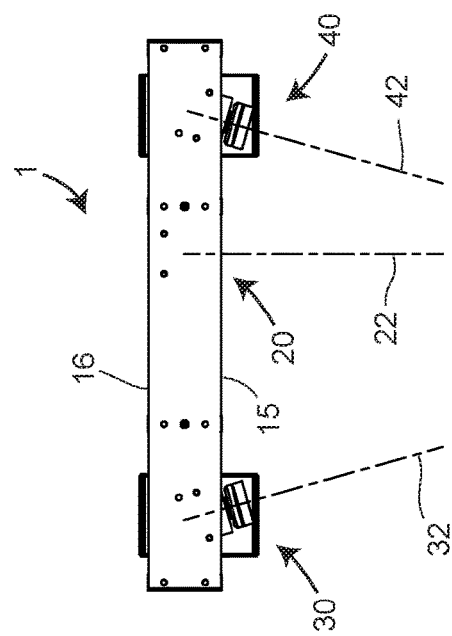

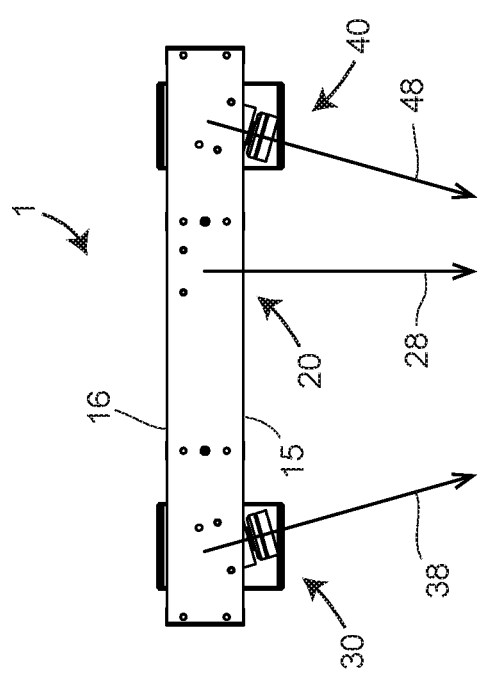

TOP VIEW
FIG. 9A
SIDE VIEW
FIG. 9B

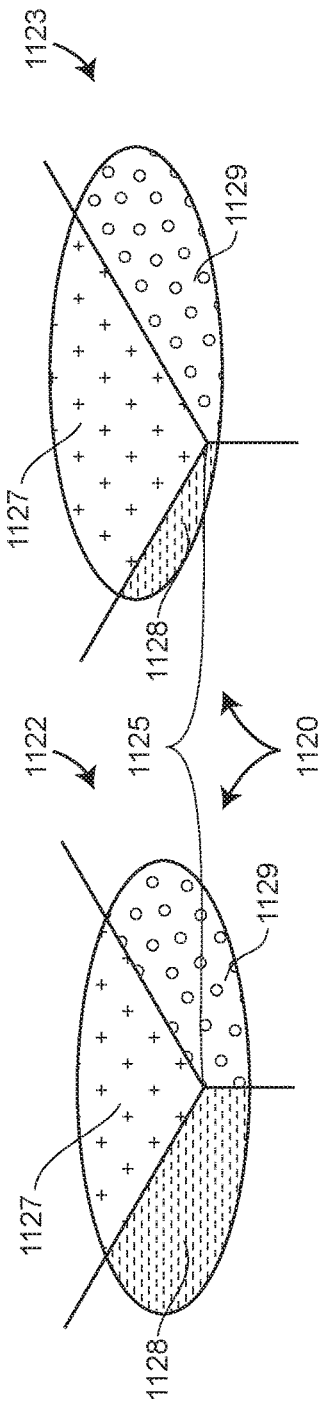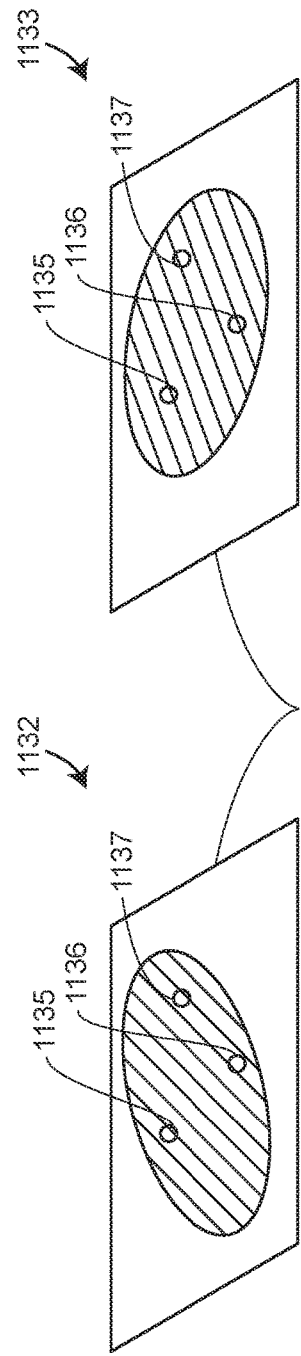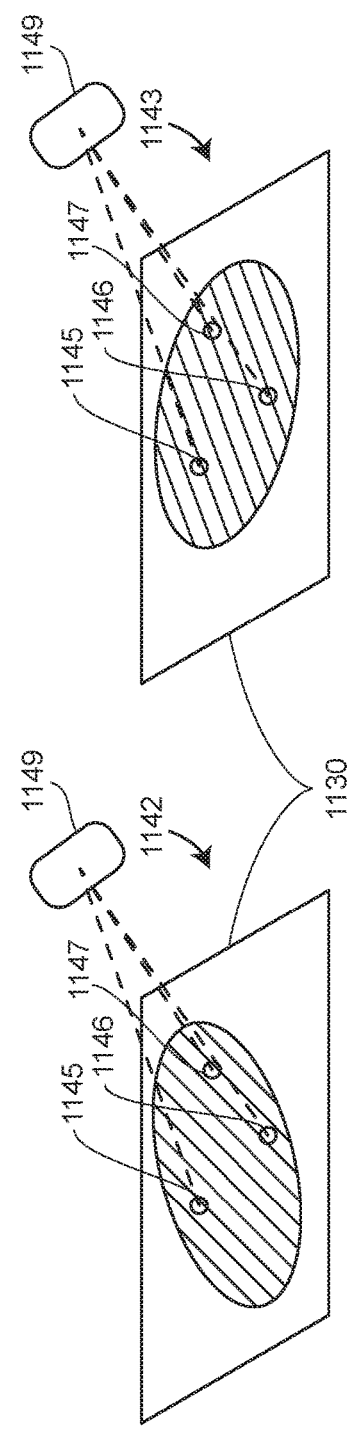

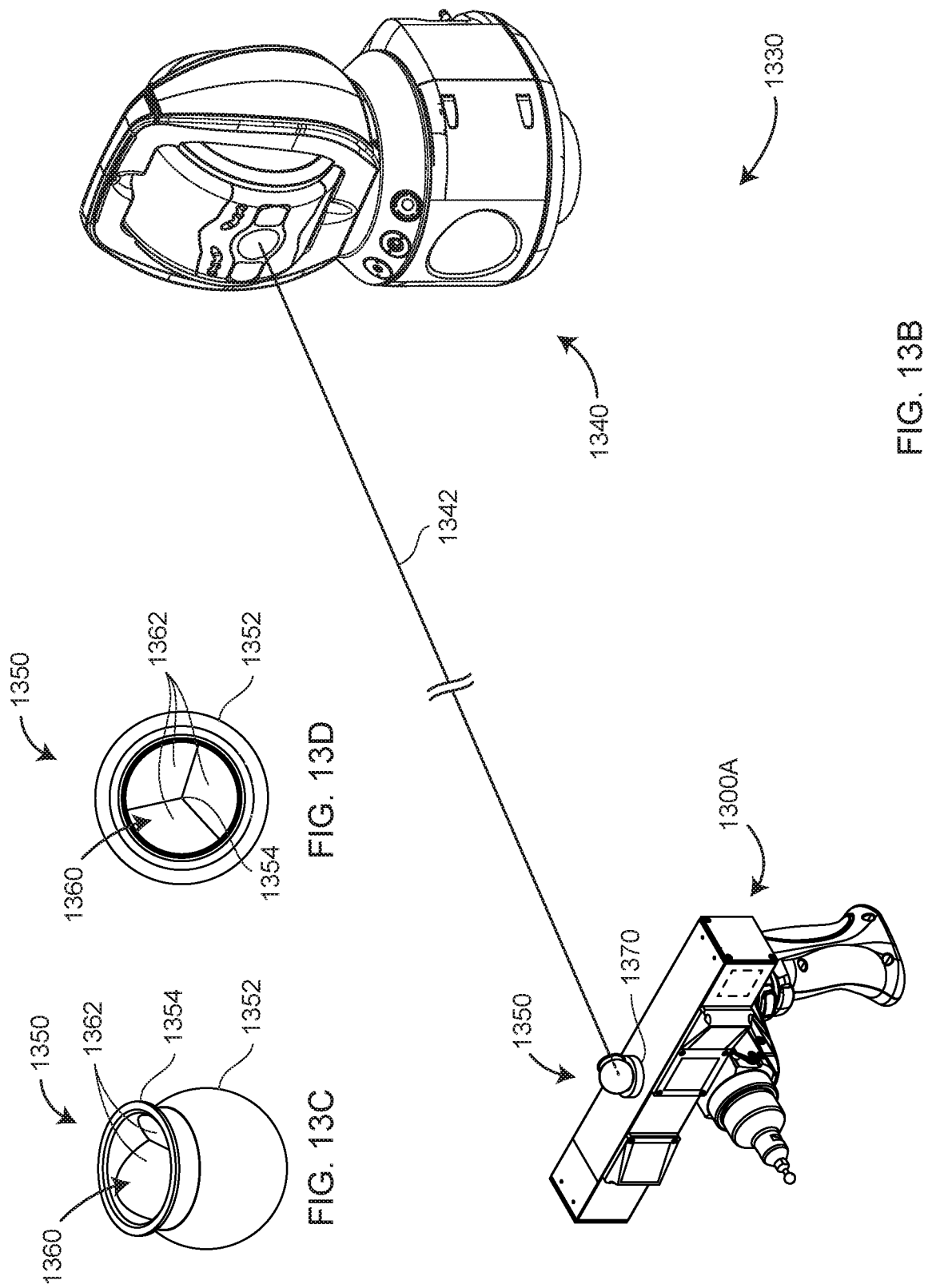

TRIANGULATION SCANNER HAVING FLAT GEOMETRY AND PROJECTING UNCODED SPOTS

CROSS-REFERENCE TO RELATED APPLICATIONS

The present Application is a Nonprovisional Application of U.S. Provisional Application Ser. No. 62/502,065 filed on May 5, 2017, the contents of which are incorporated by reference herein in their entirety.

BACKGROUND

The subject matter disclosed herein relates to a triangulation scanner having a flat geometry. The triangulation scanner projects uncoded spots onto an object and in response determines three-dimensional (3D) coordinates of points on the object.

Triangulation scanners generally include at least one projector and at least one camera, the projector and camera separated by a baseline distance. Such scanners use a triangulation calculation to determine 3D coordinates of points on an object based at least in part on the projected pattern of light and the captured camera image. One category of triangulation scanner, referred to herein as a single-shot scanner, obtains 3D coordinates of the object points based on a single projected pattern of light. Another category of triangulation scanner, referred to herein as a sequential scanner, obtains 3D coordinates of the object points based on a sequence of projected patterns from a stationary projector onto the object.

In the case of a single-shot triangulation scanner, the triangulation calculation is based at least in part on a determined correspondence among elements in each of two patterns. The two patterns may include a pattern projected by the projector and a pattern captured by the camera. Alternatively, the two patterns may include a first pattern captured by a first camera and a second pattern captured by a second camera. In either case, the determination of 3D coordinates by the triangulation calculation provides that a correspondence be determined between pattern elements in each of the two patterns. In most cases, the correspondence is obtained by matching pattern elements in the projected or captured pattern. An alternative approach is described in U.S. Pat. No. 9,599,455 ('455) to Heidemann, et al., the contents of which are incorporated by reference herein. In this approach, the correspondence is determined, not by matching pattern elements, but by identifying spots at the intersection of epipolar lines from two cameras and a projector or from two projectors and a camera. In an embodiment, supplementary 2D camera images may further be used to register multiple collected point clouds together in a common frame of reference. For the system described in Patent '455, the three camera and projector elements are arranged in a triangle, which enables the intersection of the epipolar lines.

In some cases, it is desirable to make the triangulation scanner more compact than is possible in the triangular arrangement of projector and camera elements. Accordingly, while existing triangulation systems are suitable for their intended purpose, the need for improvement remains, particularly in providing a compact triangulation scanner that projects uncoded spots.

BRIEF DESCRIPTION

According to one aspect of the invention, a method comprises: in a first instance: with a projector having a perspective center, projecting a first uncoded pattern of uncoded spots from a projector reference plane to form illuminated object spots on an object; with a first camera having a first-camera perspective center, capturing the illuminated object spots as first-image spots in a first image; with a second camera having a second-camera perspective center, capturing the illuminated object spots as second-image spots in a second image; with a processor, determining three-dimensional (3D) coordinates of a first collection of points on the object, the 3D coordinates of the first collection of points based at least in part on the first uncoded pattern of uncoded spots, the first image, the second image, the relative positions of the projector, the first camera, and the second camera, and on a selected plurality of intersection sets, each intersection set including a first spot, a second spot, and a third spot, the first spot being one of the uncoded spots in the projector reference plane, the second spot being one of the first-image spots, the third spot being one of the second-image spots, the selecting of each intersection set based at least in part on a nearness of intersection of a first line, a second line, and a third line, the first line being a line drawn from the first spot through the projector perspective center, the second line being a line drawn from the second spot through the first-camera perspective center, the third line being a line drawn from the third spot through the second-camera perspective center; and storing the determined 3D coordinates of the first collection of points.

According to another aspect of the invention, a system comprises: a projector having a perspective center, the projector operable to project a first uncoded pattern of uncoded spots from a projector reference plane to form illuminated object spots on an object; a first camera having a first-camera perspective center, the first camera operable to capture the illuminated object spots as first-image spots in a first image; a second camera having a second-camera perspective center, the second camera operable to capture the illuminated object spots as second-image spots in a second image; and a processor operable to execute computer instructions that, when executed on the processor, determine three-dimensional (3D) coordinates of a first collection of points on the object, the 3D coordinates of the first collection of points based at least in part, in a first instance, on the first uncoded pattern of uncoded spots, the first image, the second image, the relative positions of the projector, the first camera, and the second camera, and on a selected plurality of intersection sets, each intersection set including a first spot, a second spot, and a third spot, the first spot being one of the uncoded spots in the projector reference plane, the second spot being one of the first-image spots, the third spot being one of the second-image spots, the selecting of each intersection set based at least in part on a nearness of intersection of a first line, a second line, and a third line, the first line being a line drawn from the first spot through the projector perspective center, the second line being a line drawn from the second spot through the first-camera perspective center, the third line being a line drawn from the third spot through the second-camera perspective center.

According to another aspect of the invention, a system comprises: a projector having a projector optical axis and a projector perspective center, the projector operable to project onto an object a collection of uncoded spots of light in a first uncoded pattern; a first camera having a first-camera optical axis and a first-camera perspective center, the first camera operable to capture a first image of the collection of uncoded spots of light on the object; a second camera having a second-camera optical axis and a second-camera perspective center, the second camera operable to capture a second image of the collection of uncoded spots of light on the object; an enclosure having a front side, the front side intersected by the projector optical axis, the first-camera optical axis, and the second-camera optical axis, the front side further intersected by a first plane that includes the projector perspective center, the first-camera optical axis, and the second-camera optical axis; and a processor operable to execute computer instructions that, when executed on the processor, determine three-dimensional (3D) coordinates of a point on the object based at least in part on the first uncoded pattern of uncoded spots, the first image, and the second image.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 1A, 1B, 1C, 1D, 1E are isometric, partial isometric, partial top, partial front, and second partial top views, respectively, of a triangulation scanner according to an embodiment of the present invention;

FIGS. 9A, 9B are top and side views of point cloud data of bottles wrapped in a thin translucent material according to an embodiment of the present invention;

FIGS. 11D, 11E illustrate a method for obtaining registration when edge features are present according to an embodiment of the present invention;

FIGS. 11F, 11G illustrate a method for obtaining registration of a flat surface using natural or artificial features according to an embodiment of the present invention;

FIGS. 11H, 11J illustrate a method for obtaining registration of a flat surface by projecting markers onto the surface with an external projector according to an embodiment of the present invention;

FIG. 13B illustrate a laser tracker used to track the position of a handheld 3D measuring device according to an embodiment of the present invention;

FIGS. 13C, 13D are isometric and front views of a spherically mounted retroreflector according to an embodiment;

Figure 2A:
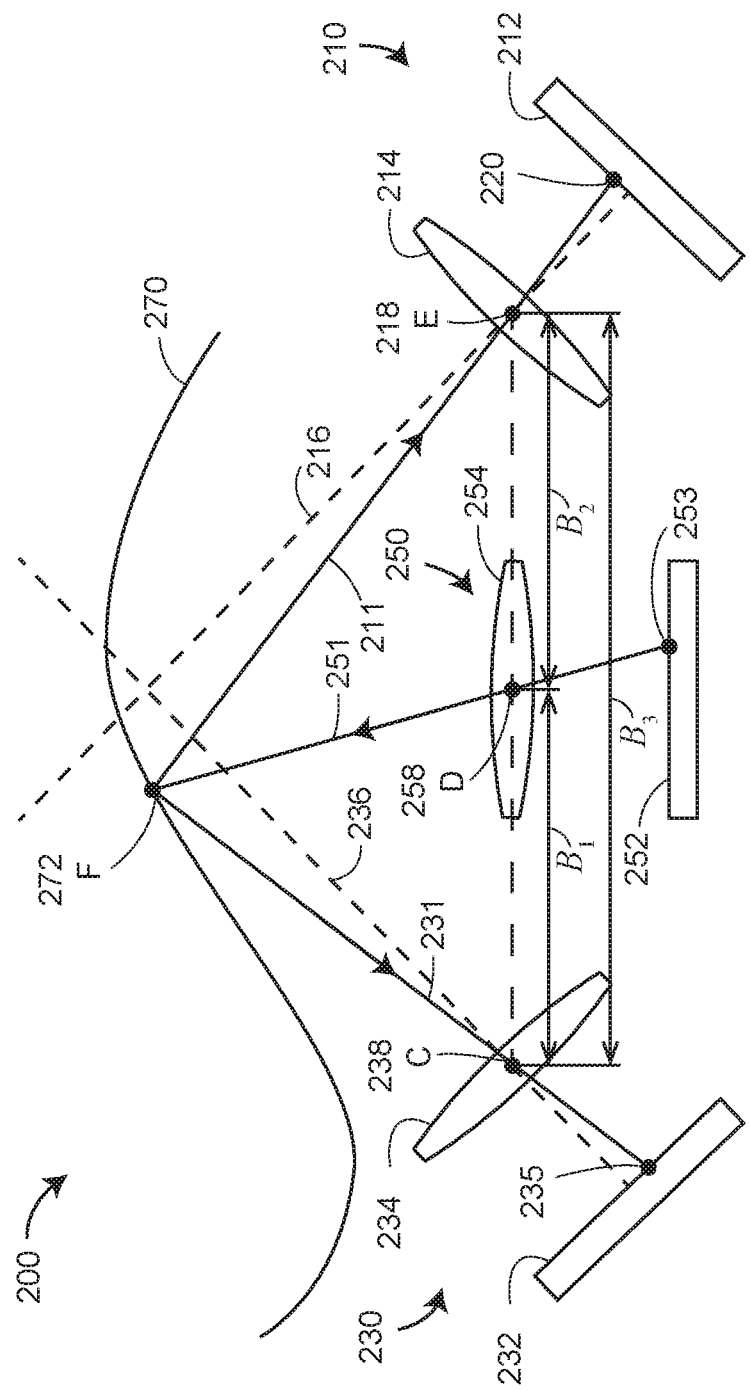
FIG. 2A is a schematic view of a triangulation scanner having a projector, a first camera, and a second camera according to an embodiment of the present invention.

The detailed description explains embodiments of the invention, together with advantages and features, by way of example with reference to the drawings.

DETAILED DESCRIPTION

Embodiments of the present invention provide advantages in enabling 3D measurements to be obtained using a relatively compact, low-cost, and accurate triangulation scanner, also referred to herein as a 3D imager. It further provides advantages in enabling rapid registration, extracting of six degree-of-freedom pose information, and control of robotic mechanisms. Other embodiments enable further improvements through combined used of scanning technologies with laser trackers or articulated arm coordinate measuring machines.

In an embodiment of the present invention illustrated in FIGS. 1A, 1B, 1C, 1D, a triangulation scanner 1 includes a body 5, a projector 20, a first camera 30, and a second camera 40. In an embodiment, the projector optical axis 22 of the projector 20, the first-camera optical axis 32 of the first camera 30, and the second-camera optical axis 42 of the second camera 40 all lie on a common plane 50, as shown in FIGS. 1C, 1D. In some embodiments, an optical axis passes through a center of symmetry of an optical system, which might be a projector or a camera, for example. For example, an optical axis may pass through a center of curvature of lens surfaces or mirror surfaces in an optical system. The common plane 50, also referred to as a first plane 50, extends perpendicular into and out of the paper in FIG. 1D.

In an embodiment, the body 5 includes a bottom support structure 6, a top support structure 7, spacers 8, camera mounting plates 9, bottom mounts 10, dress cover 11, windows 12 for the projector and cameras, Ethernet connectors 13, and GPIO connector 14. In addition, the body includes a front side 15 and a back side 16. In an embodiment, the bottom support structure 6 and the top support structure 7 are flat plates made of carbon-fiber composite material. In an embodiment, the carbon-fiber composite material has a low coefficient of thermal expansion (CTE). In an embodiment, the spacers 8 are made of aluminum and are sized to provide a common separation between the bottom support structure 6 and the top support structure 7.

Figure 5C:
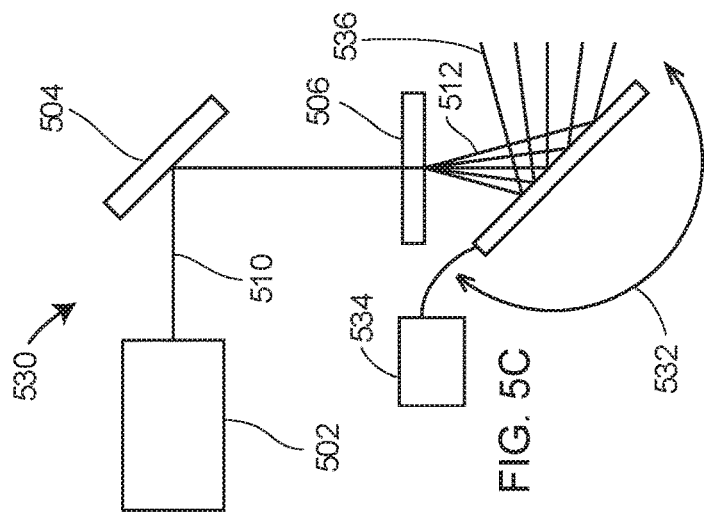
FIGS. 5A, 5B, 5C, 5D, 5E are schematic diagrams illustrating different types of projectors according to embodiments of the present invention.

In an embodiment, the projector 20 includes a projector body 24 and a projector front surface 26. In an embodiment, the projector 20 includes a light source 25 that attaches to the projector body 24 that includes a turning mirror and a diffractive optical element (DOE), as explained herein below with respect to FIGS. 5A, 5B, 5C. The light source 25 may be a laser, a superluminescent diode, or a partially coherent LED, for example. In an embodiment, the DOE produces an array of spots arranged in a regular pattern. In an embodiment, the projector 20 emits light at a near infrared wavelength.

In an embodiment, the first camera 30 includes a first-camera body 34 and a first-camera front surface 36. In an embodiment, the first camera includes a lens, a photosensitive array, and camera electronics. The first camera 30 forms on the photosensitive array a first image of the uncoded spots projected onto an object by the projector 20. In an embodiment, the first camera responds to near infrared light.

In an embodiment, the second camera 40 includes a second-camera body 44 and a second-camera front surface 46. In an embodiment, the second camera includes a lens, a photosensitive array, and camera electronics. The second camera 40 forms a second image of the uncoded spots projected onto an object by the projector 20. In an embodiment, the second camera responds to light in the near infrared spectrum. In an embodiment, a processor 2 is used to determine 3D coordinates of points on an object according to methods described herein below. The processor 2 may be included inside the body 5 or may be external to the body. In further embodiments, more than one processor is used. In still further embodiments, the processor 2 may be remotely located from the triangulation scanner.

FIG. 1E is a top view of the triangulation scanner 1. A projector ray 28 extends along the projector optical axis from the body of the projector 24 through the projector front surface 26. In doing so, the projector ray 28 passes through the front side 15. A first-camera ray 38 extends along the first-camera optical axis 32 from the body of the first camera 34 through the first-camera front surface 36. In doing so, the front-camera ray 38 passes through the front side 15. A second-camera ray 48 extends along the second-camera optical axis 42 from the body of the second camera 44 through the second-camera front surface 46. In doing so, the second-camera ray 48 passes through the front side 15.

FIG. 2 shows elements of a triangulation scanner 200 that might, for example, be the triangulation scanner 1 shown in FIGS. 1A, 1B, 1C, 1D, 1E. In an embodiment, the triangulation scanner 200 includes a projector 250, a first camera 210, and a second camera 230. In an embodiment, the projector 250 creates a pattern of light on a pattern generator plane 252. An exemplary corrected point 253 on the pattern projects a ray of light 251 through the perspective center 258 (point D) of the lens 254 onto an object surface 270 at a point 272 (point F). The point 272 is imaged by the first camera 210 by receiving a ray of light from the point 272 through the perspective center 218 (point E) of the lens 214 onto the surface of a photosensitive array 212 of the camera as a corrected point 220. The point 220 is corrected in the read-out data by applying a correction value to remove the effects of lens aberrations. The point 272 is likewise imaged by the second camera 230 by receiving a ray of light from the point 272 through the perspective center 238 (point C) of the lens 234 onto the surface of the photosensitive array 232 of the second camera as a corrected point 235. It should be understood that as used herein any reference to a lens includes any type of lens system whether a single lens or multiple lens elements, including an aperture within the lens system. It should be understood that any reference to a projector in this document refers not only to a system projecting with a lens or lens system an image plane to an object plane. The projector does not necessarily have a physical pattern-generating plane 252 but may have any other set of elements that generate a pattern. For example, in a projector having a DOE, the diverging spots of light may be traced backward to obtain a perspective center for the projector and also to obtain a reference projector plane that appears to generate the pattern. In most cases, the projectors described herein propagate uncoded spots of light in an uncoded pattern. However, a projector may further be operable to project coded spots of light, to project in a coded pattern, or to project coded spots of light in a coded pattern. In other words, in some aspects of the present invention, the projector is at least operable to project uncoded spots in an uncoded pattern but may in addition project in other coded elements and coded patterns.

In an embodiment where the triangulation scanner 200 of FIG. 2 is a single-shot scanner that determines 3D coordinates based on a single projection of a projection pattern and a single image captured by each of the two cameras, then a correspondence between the projector point 253, the image point 220, and the image point 235 may be obtained by matching a coded pattern projected by the projector 250 and received by the two cameras 210, 230. Alternatively, the coded pattern may be matched for two of the three elements—for example, the two cameras 210, 230 or for the projector 250 and one of the two cameras 210 or 230. This is possible in a single-shot triangulation scanner because of coding in the projected elements or in the projected pattern or both.

After a correspondence is determined among projected and imaged elements, a triangulation calculation is performed to determine 3D coordinates of the projected element on an object. For FIG. 2, the elements are uncoded spots projected in a uncoded pattern. In an embodiment, a triangulation calculation is performed based on selection of a spot for which correspondence has been obtained on each of two cameras. In this embodiment, the relative position and orientation of the two cameras is used. For example, the baseline distance $B_3$ between the perspective centers 218 and 238 is used to perform a triangulation calculation based on the first image of the first camera 210 and on the second image of the second camera 230. Likewise, the baseline $B_1$ is used to perform a triangulation calculation based on the projected pattern of the projector 250 and on the second image of the second camera 230. Similarly, the baseline $B_2$ is used to perform a triangulation calculation based on the projected pattern of the projector 250 and on the first image of the first camera 210. In an embodiment of the present invention, the correspondence is determined based at least on an uncoded pattern of uncoded elements projected by the projector, a first image of the uncoded pattern captured by the first camera, and a second image of the uncoded pattern captured by the second camera. In an embodiment, the correspondence is further based at least in part on a position of the projector, the first camera, and the second camera. In a further embodiment, the correspondence is further based at least in part on an orientation of the projector, the first camera, and the second camera.

The term "uncoded element" or "uncoded spot" as used herein refers to a projected or imaged element that includes no internal structure that enables it to be distinguished from other uncoded elements that are projected or imaged. The term "uncoded pattern" as used herein refers to a pattern in which information is not encoded in the relative positions of projected or imaged elements. For example, one method for encoding information into a projected pattern is to project a quasi-random pattern of "dots" in which the relative position of the dots is known ahead of time and can be used to determine correspondence of elements in two images or in a projection and an image. Such a quasi-random pattern contains information that may be used to establish correspondence among points and hence is not an example of a uncoded pattern. An example of an uncoded pattern is a rectilinear pattern of projected pattern elements.

Figure 2B:
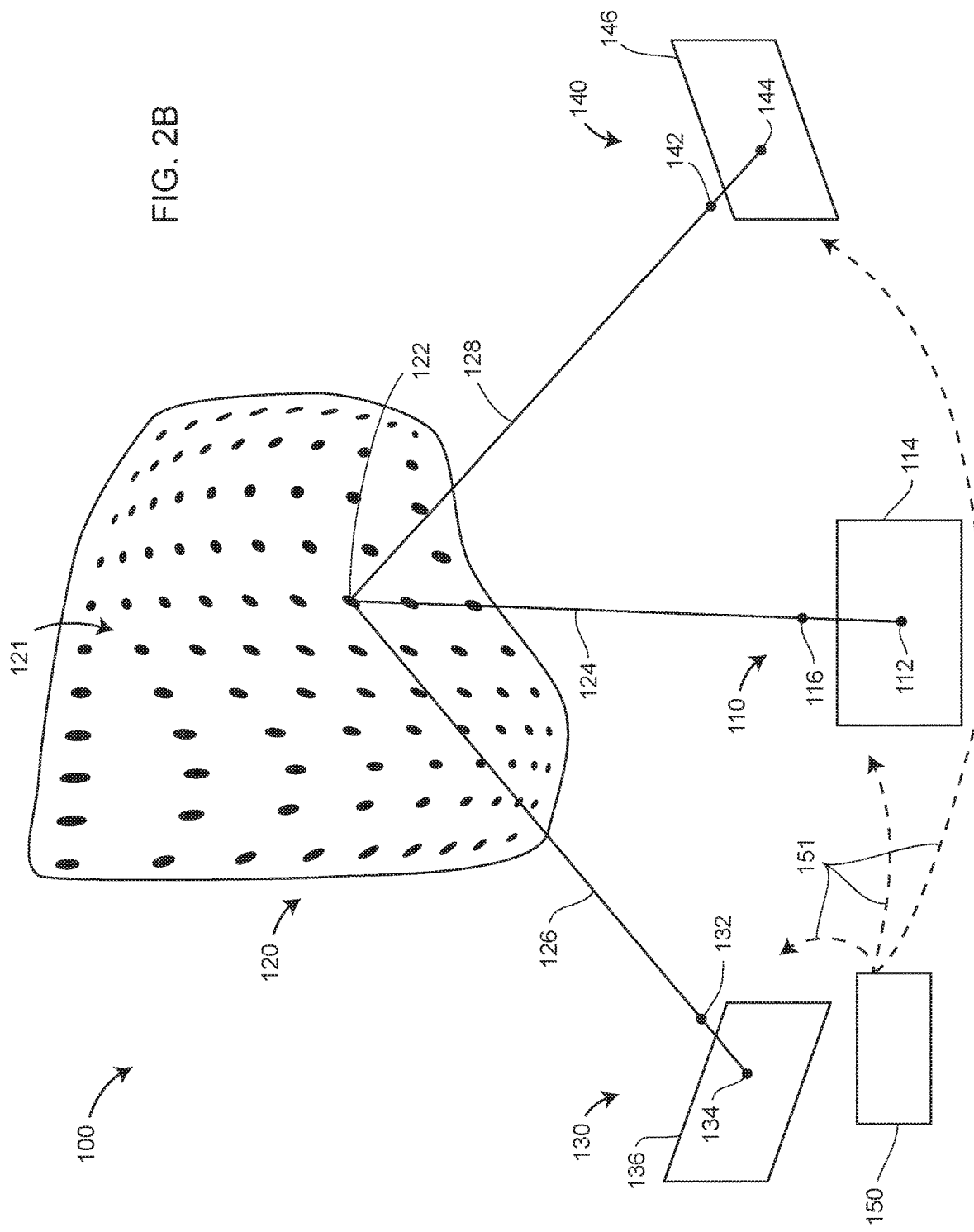
FIG. 2B is a schematic representation of a triangulation scanner having a projector that projects and uncoded pattern of uncoded spots, received by a first camera, and a second camera according to an embodiment of the present invention.

In an embodiment, uncoded spots are projected in an uncoded pattern as illustrated in the scanner system 100 of FIG. 2B. In an embodiment, the scanner system 100 includes a projector 110, a first camera 130, a second camera 140, and a processor 150. The projector projects an uncoded pattern of uncoded spots off a projector reference plane 114. In an embodiment illustrated in FIGS. 2B and 2C, the uncoded pattern of uncoded spots is a rectilinear array 111 of circular spots that form illuminated object spots 121 on the object 120. In an embodiment, the rectilinear array of spots 111 arriving at the object 120 is modified or distorted into the pattern of illuminated object spots 121 according to the characteristics of the object 120. An exemplary uncoded spot 112 from within the projected rectilinear array 111 is projected onto the object 120 as a spot 122. The direction from the projector spot 112 to the illuminated object spot 122 may be found by drawing a straight line 124 from the projector spot 112 on the reference plane 114 through the projector perspective center 116. The location of the projector perspective center 116 is determined by the characteristics of the projector optical system.

In an embodiment, the illuminated object spot 122 produces a first image spot 134 on the first image plane 136 of the first camera 130. The direction from the first image spot to the illuminated object spot 122 may be found by drawing a straight line 126 from the first image spot 134 through the first camera perspective center 132. The location of the first camera perspective center 132 is determined by the characteristics of the first camera optical system.

In an embodiment, the illuminated object spot 122 produces a second image spot 144 on the second image plane 146 of the second camera 140. The direction from the second image spot 144 to the illuminated object spot 122 may be found by drawing a straight line 126 from the second image spot 144 through the second camera perspective center 142. The location of the second camera perspective center 142 is determined by the characteristics of the second camera optical system.

In an embodiment, a processor 150 is in communication with the projector 110, the first camera 130, and the second camera 140. Either wired or wireless channels 151 may be used to establish connection among the processor 150, the projector 110, the first camera 130, and the second camera 140. The processor may include a single processing unit or multiple processing units and may include components such as microprocessors, field programmable gate arrays (FPGAs), digital signal processors (DSPs), and other electrical components. The processor may be local to a scanner system that includes the projector, first camera, and second camera, or it may be distributed and may include networked processors. The term processor encompasses any type of computational electronics and may include memory storage elements.

Figure 2C:
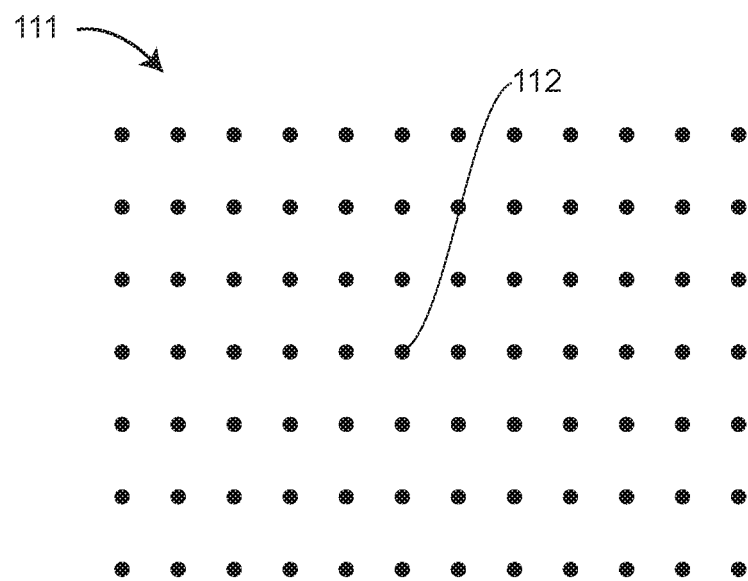
FIG. 2C is an example of an uncoded pattern of uncoded spots according to an embodiment of the present invention.
Figure 2D:
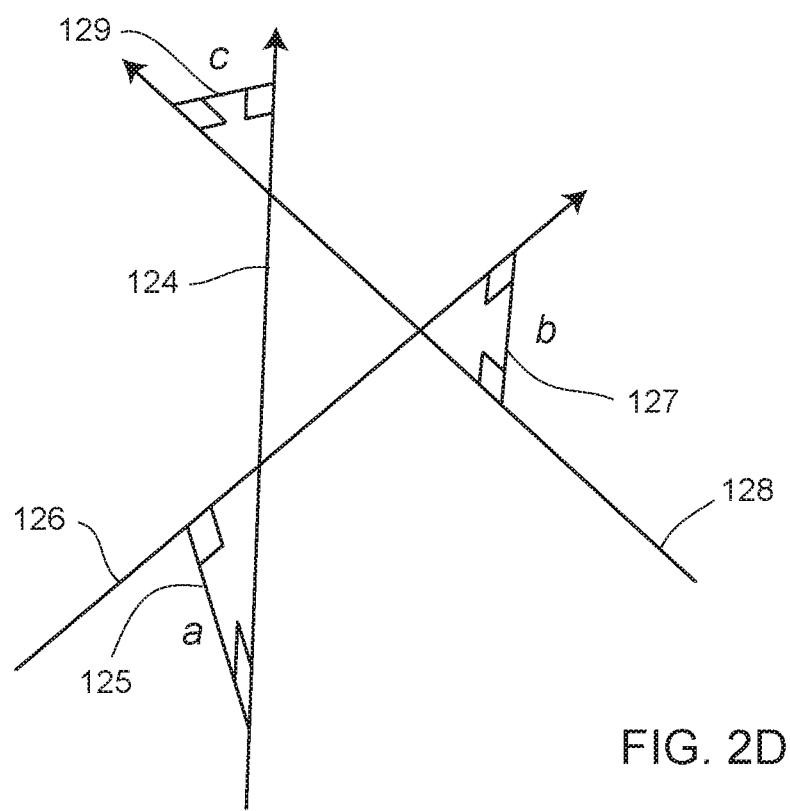
FIG. 2D is a representation of one mathematical method that might be used to determine a nearness of intersection of three lines according to an embodiment of the present invention.
Figure 2E:
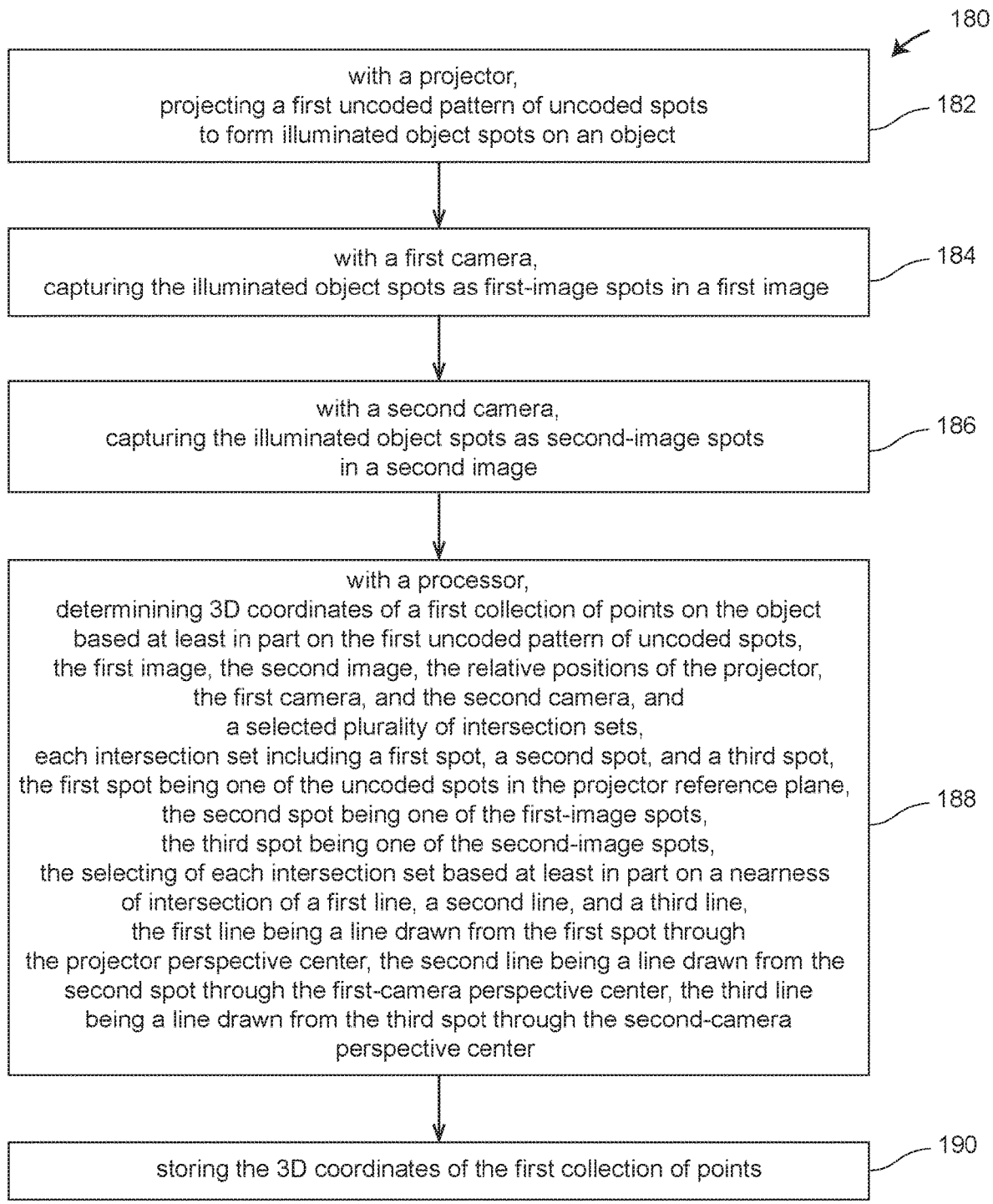
FIG. 2E is a list of elements in a method for determining 3D coordinates of an object according to embodiment of the present invention.

FIG. 2E shows elements of a method 180 for determining 3D coordinates of points on an object. An element 182 includes projecting, with a projector, a first uncoded pattern of uncoded spots to form illuminated object spots on an object. FIGS. 2B, 2C illustrate this element 182 using an embodiment 100 in which a projector 110 projects a first uncoded pattern of uncoded spots 111 to form illuminated object spots 121 on an object 120.

A method element 184 includes capturing with a first camera the illuminated object spots as first-image spots in a first image. This element is illustrated in FIG. 2B using an embodiment in which a first camera 130 captures illuminated object spots 121, including the first-image spot 134, which is an image of the illuminated object spot 122. A method element 186 includes capturing with a second camera the illuminated object spots as second-image spots in a second image. This element is illustrated in FIG. 2B using an embodiment in which a second camera 140 captures illuminated object spots 121, including the second-image spot 144, which is an image of the illuminated object spot 122.

A first aspect of method element 188 includes determining with a processor 3D coordinates of a first collection of points on the object based at least in part on the first uncoded pattern of uncoded spots, the first image, the second image, the relative positions of the projector, the first camera, and the second camera, and a selected plurality of intersection sets. This aspect of the element 188 is illustrated in FIGS. 2B, 2C using an embodiment in which the processor 150 determines the 3D coordinates of a first collection of points corresponding to object spots 121 on the object 120 based at least in the first uncoded pattern of uncoded spots 111, the first image 136, the second image 146, the relative positions of the projector 110, the first camera 130, and the second camera 140, and a selected plurality of intersection sets. An example from FIG. 2B of an intersection set is the set that includes the points 112, 134, and 144. Any two of these three points may be used to perform a triangulation calculation to obtain 3D coordinates of the illuminated object spot 122 as discussed herein above in reference to FIGS. 2A, 2B.

A second aspect of the method element 188 includes selecting with the processor a plurality of intersection sets, each intersection set including a first spot, a second spot, and a third spot, the first spot being one of the uncoded spots in the projector reference plane, the second spot being one of the first-image spots, the third spot being one of the second-image spots, the selecting of each intersection set based at least in part on the nearness of intersection of a first line, a second line, and a third line, the first line being a line drawn from the first spot through the projector perspective center, the second line being a line drawn from the second spot through the first-camera perspective center, the third line being a line drawn from the third spot through the second-camera perspective center. This aspect of the element 188 is illustrated in FIG. 2B using an embodiment in which one intersection set includes the first spot 112, the second spot 134, and the third spot 144. In this embodiment, the first line is the line 124, the second line is the line 126, and the third line is the line 128. The first line 124 is drawn from the uncoded spot 112 in the projector reference plane 114 through the projector perspective center 116. The second line 126 is drawn from the first-image spot 134 through the first-camera perspective center 132. The third line 128 is drawn from the second-image spot 144 through the second-camera perspective center 142. The processor 150 selects intersection sets based at least in part on the nearness of intersection of the first line 124, the second line 126, and the third line 128.

The processor 150 may determine the nearness of intersection of the first line, the second line, and the third line based on any of a variety of criteria. For example, in an embodiment, the criterion for the nearness of intersection is based on a distance between a first 3D point and a second 3D point. In an embodiment, the first 3D point is found by performing a triangulation calculation using the first image point 134 and the second image point 144, with the baseline distance used in the triangulation calculation being the distance between the perspective centers 132 and 142. In the embodiment, the second 3D point is found by performing a triangulation calculation using the first image point 134 and the projector point 112, with the baseline distance used in the triangulation calculation being the distance between the perspective centers 134 and 116. If the three lines 124, 126, and 128 nearly intersect at the object point 122, then the calculation of the distance between the first 3D point and the second 3D point will result in a relatively small distance. On the other hand, a relatively large distance between the first 3D point and the second 3D would indicate that the points 112, 134, and 144 did not all correspond to the object point 122.

As another example, in an embodiment, the criterion for the nearness of the intersection is based on a maximum of closest-approach distances between each of the three pairs of lines. This situation is illustrated in FIG. 2D. A line of closest approach 125 is drawn between the lines 124 and 126. The line 125 is perpendicular to each of the lines 124, 126 and has a nearness-of-intersection length a. A line of closest approach 127 is drawn between the lines 126 and 128. The line 127 is perpendicular to each of the lines 126, 128 and has length b. A line of closest approach 129 is drawn between the lines 124 and 128. The line 129 is perpendicular to each of the lines 124, 128 and has length c. According to the criterion described in the embodiment above, the value to be considered is the maximum of a, b, and c. A relatively small maximum value would indicate that points 112, 134, and 144 have been correctly selected as corresponding to the illuminated object point 122. A relatively large maximum value would indicate that points 112, 134, and 144 were incorrectly selected as corresponding to the illuminated object point 122.

The processor 150 may use many other criteria to establish the nearness of intersection. For example, for the case in which the three lines were coplanar, a circle inscribed in a triangle formed from the intersecting lines would be expected to have a relatively small radius if the three points 112, 134, 144 corresponded to the object point 122. For the case in which the three lines were not coplanar, a sphere having tangent points contacting the three lines would be expected to have a relatively small radius.

It should be noted that the selecting of intersection sets based at least in part on a nearness of intersection of the first line, the second line, and the third line is not used in most other projector-camera methods based on triangulation. For example, for the case in which the projected points are coded points, which is to say, recognizable as corresponding when compared on projection and image planes, there is no need to determine a nearness of intersection of the projected and imaged elements. Likewise, when a sequential method is used, such as the sequential projection of phase-shifted sinusoidal patterns, there is no need to determine the nearness of intersection as the correspondence among projected and imaged points is determined based on a pixel-by-pixel comparison of phase determined based on sequential readings of optical power projected by the projector and received by the camera(s). The method element 190 includes storing 3D coordinates of the first collection of points.

Figure 3:
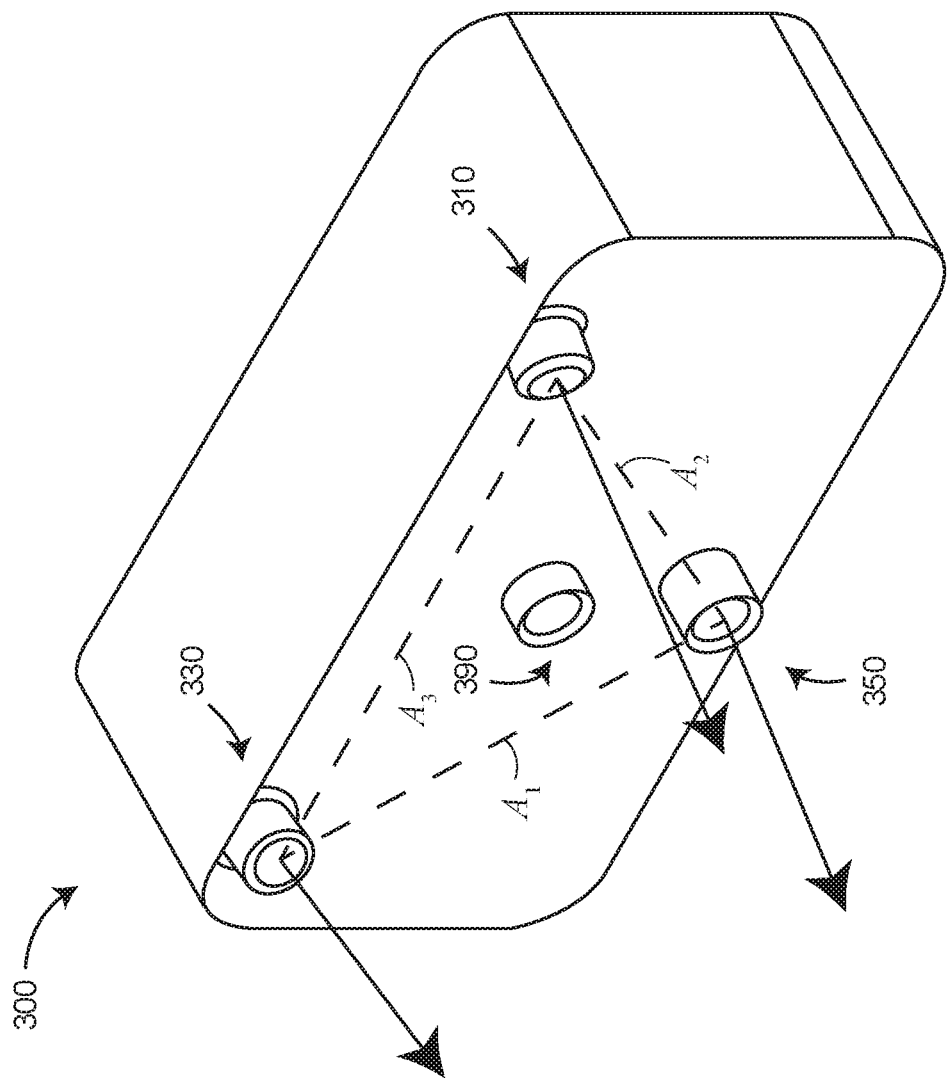
FIG. 3 is an isometric view of a triangulation scanner having a projector and two cameras arranged in a triangle.

An alternative method that uses the intersection of epipolar lines on epipolar planes to establish correspondence among uncoded points projected in an uncoded pattern is described in Patent '455, referenced herein above. In an embodiment of the method described in Patent '455, a triangulation scanner places a projector and two cameras in a triangular pattern. An example of a triangulation scanner 300 having such a triangular pattern is shown in FIG. 3. The triangulation scanner 300 includes a projector 350, a first camera 310, and a second camera 330 arranged in a triangle having sides A1-A2-A3. In an embodiment, the triangulation scanner 300 may further include an additional camera 390 not used for triangulation but to assist in registration and colorization.

Figure 4:
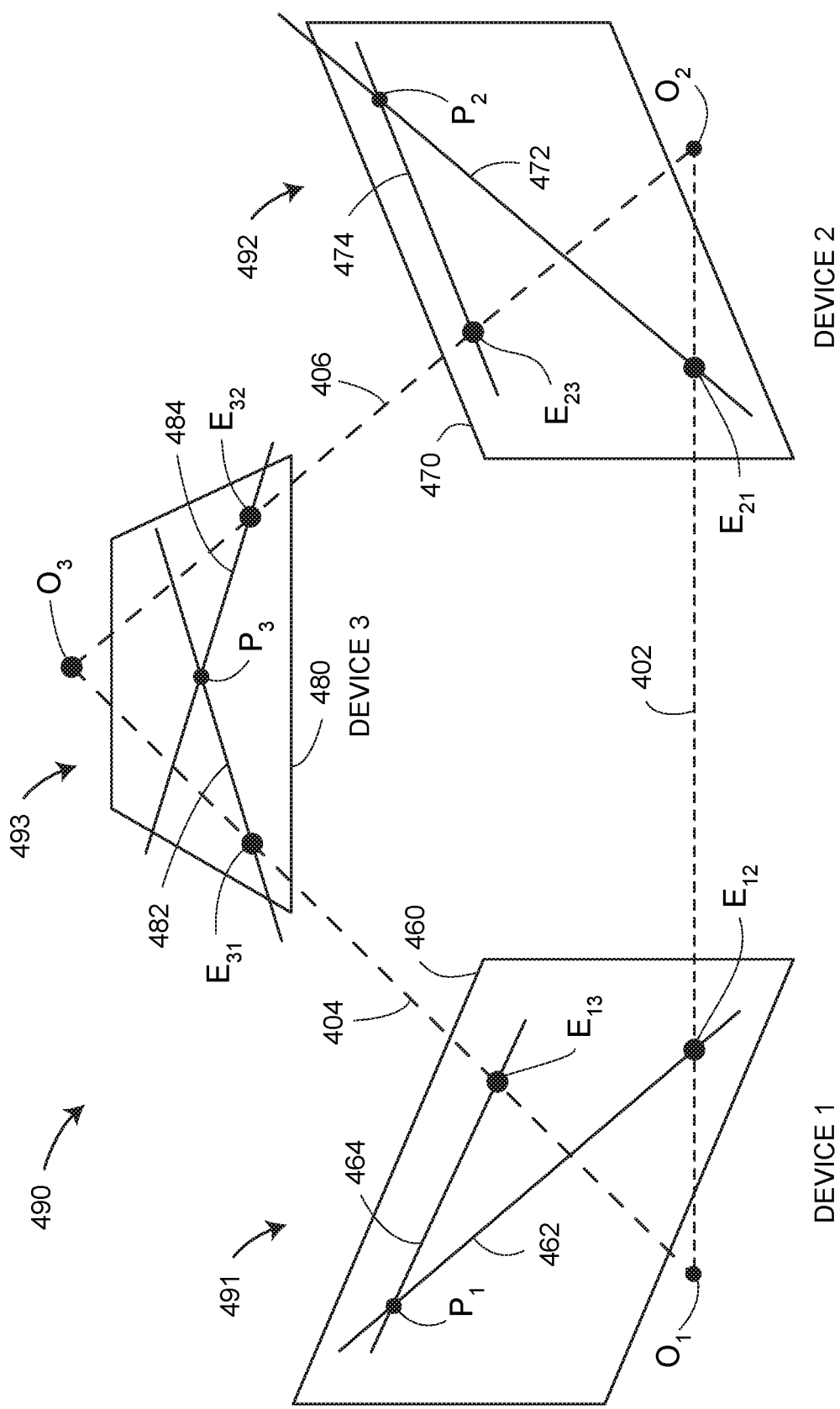
FIG. 4 is a schematic illustration of intersecting epipolar lines in epipolar planes for a combination of projectors and cameras.

Referring now to FIG. 4 the epipolar relationships for a 3D imager (triangulation scanner) 490 correspond with 3D imager 300 of FIG. 3 in which two cameras and one projector are arranged in the shape of a triangle having sides 402, 404, 406. In general, the device 1, device 2, and device 3 may be any combination of cameras and projectors as long as at least one of the devices is a camera. Each of the three devices 491, 492, 493 has a perspective center $O_1$, $O_2$, $O_3$, respectively, and a reference plane 460, 470, and 480, respectively. In FIG. 4, the reference planes 460, 470, 480 are epipolar planes corresponding to physical planes such as an image plane of a photosensitive array or a projector plane of a projector pattern generator surface but with the planes projected to mathematically equivalent positions opposite the perspective centers $O_1$, $O_2$, $O_3$. Each pair of devices has a pair of epipoles, which are points at which lines drawn between perspective centers intersect the epipolar planes. Device 1 and device 2 have epipoles $E_{12}$, $E_{21}$ on the planes 460, 470, respectively. Device 1 and device 3 have epipoles $E_{13}$, $E_{31}$, respectively on the planes 460, 480, respectively. Device 2 and device 3 have epipoles $E_{23}$, $E_{32}$ on the planes 470, 480, respectively. In other words, each reference plane includes two epipoles. The reference plane for device 1 includes epipoles $E_{12}$ and $E_{13}$. The reference plane for device 2 includes epipoles $E_{21}$ and $E_{23}$. The reference plane for device 3 includes epipoles $E_{31}$ and $E_{32}$.

In an embodiment, the device 3 is a projector 493, the device 1 is a first camera 491, and the device 2 is a second camera 492. Suppose that a projection point $P_3$, a first image point $P_1$, and a second image point $P_2$ are obtained in a measurement. These results can be checked for consistency in the following way.

To check the consistency of the image point $P_1$, intersect the plane $P_3$-$E_{31}$-$E_{13}$ with the reference plane 460 to obtain the epipolar line 464. Intersect the plane $P_2$-$E_{21}$-$E_{12}$ to obtain the epipolar line 462. If the image point $P_1$ has been determined consistently, the observed image point $P_1$ will lie on the intersection of the determined epipolar lines 462 and 464.

To check the consistency of the image point $P_2$, intersect the plane $P_3$-$E_{32}$-$E_{23}$ with the reference plane 470 to obtain the epipolar line 474. Intersect the plane $P_1$-$E_{12}$-$E_{21}$ to obtain the epipolar line 472. If the image point $P_2$ has been determined consistently, the observed image point $P_2$ will lie on the intersection of the determined epipolar lines 472 and 474.

To check the consistency of the projection point $P_3$, intersect the plane $P_2$-$E_{23}$-$E_{32}$ with the reference plane 480 to obtain the epipolar line 484. Intersect the plane $P_1$-$E_{13}$-$E_{31}$ to obtain the epipolar line 482. If the projection point $P_3$ has been determined consistently, the projection point $P_3$ will lie on the intersection of the determined epipolar lines 482 and 484.

It should be appreciated that since the geometric configuration of device 1, device 2 and device 3 are known, when the projector 493 emits a point of light onto a point on an object that is imaged by cameras 491, 492, the 3D coordinates of the point in the frame of reference of the 3D imager 490 may be determined using triangulation methods.

Note that the approach described herein above with respect to FIG. 4 may not be used to determine 3D coordinates of a point lying on a plane that includes the optical axes of device 1, device 2, and device 3 since the epipolar lines are degenerate (fall on top of one another) in this case. In other words, in this case, intersection of epipolar lines is no longer obtained. Instead, in an embodiment of the present invention, determining self-consistency of the positions of an uncoded spot on the projection plane of the projector and the image planes of the first and second cameras is used to determine correspondence among uncoded spots, as described herein above in reference to FIGS. 2B, 2C, 2D, 2E.

Figure 5B:
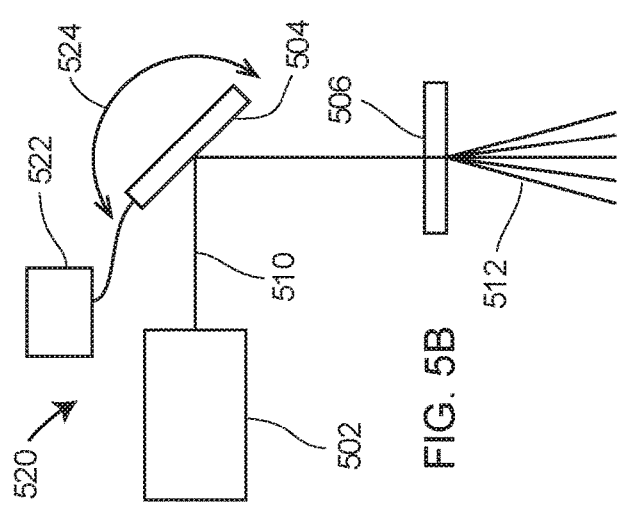
Figure 5E:
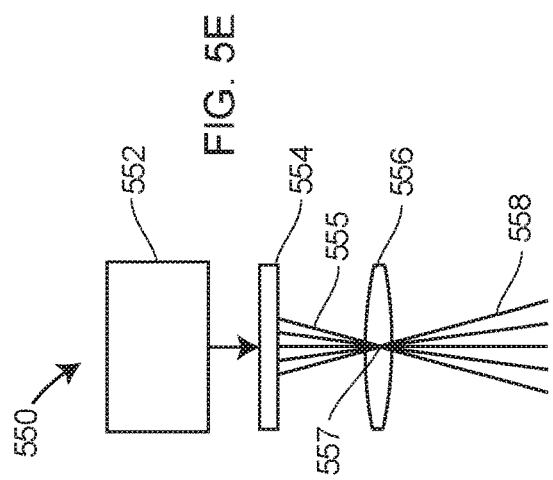
Figure 5A:
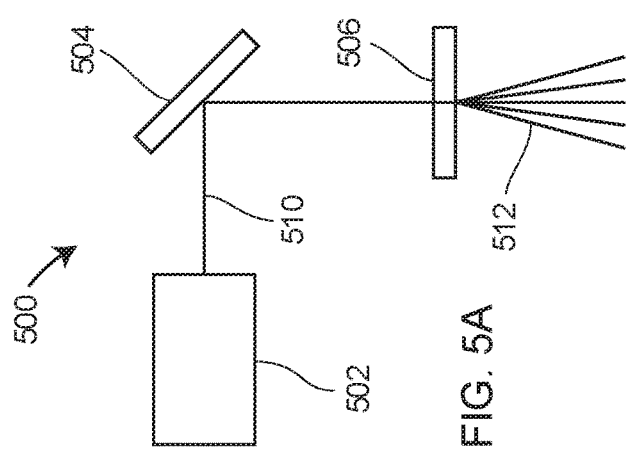

FIGS. 5A, 5B, 5C, 5D, 5E are schematic illustrations of alternative embodiments of the projector 20. In FIG. 5A, a projector 500 includes a light source, mirror 504, and diffractive optical element (DOE) 506. The light source 502 may be a laser, a superluminescent diode, or a partially coherent LED, for example. The light source 502 emits a beam of light 510 that reflects off mirror 504 and passes through the DOE. In an embodiment, the DOE 506 produces an array of diverging and uniformly distributed light spots 512. In FIG. 5B, a projector 520 includes the light source 502, mirror 504, and DOE 506 as in FIG. 5A. However, in system 520 of FIG. 5B, the mirror 504 is attached to an actuator 522 that causes rotation 524 or some other motion (such as translation) in the mirror. In response to the rotation 524, the reflected beam off the mirror 504 is redirected or steered to a new position before reaching the DOE 506 and producing the collection of light spots 512. In system 530 of FIG. 5C, the actuator is applied to a mirror 532 that redirects the beam 512 into a beam 536. Other types of steering mechanisms such as those that employ mechanical, optical, or electro-optical mechanisms may alternatively be employed in the systems of FIGS. 5A, 5B, 5C. In other embodiments, the light passes first through the pattern generating element 506 and then through the mirror 504 or is directed towards the object space without a mirror 504.

Figure 5D:
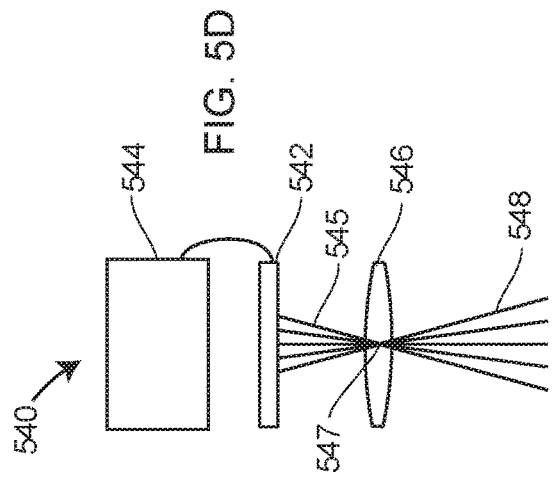

In the system 540 of FIG. 5D, an electrical signal is provided by the electronics 544 to drive a projector pattern generator 542, which may be a pixel display such as a Liquid Crystal on Silicon (LCoS) display to serve as a pattern generator unit, for example. The light 545 from the LCoS display 542 is directed through the perspective center 547 from which it emerges as a diverging collection of uncoded spots 548. In system 550 of FIG. 5E, a source is light 552 may emit light that may be sent through or reflected off of a pattern generating unit 554. In an embodiment, the source of light 552 sends light to a digital micromirror device (DMD), which reflects the light 555 through a lens 556. In an embodiment, the light is directed through a perspective center 557 from which it emerges as a diverging collection of uncoded spots 558 in an uncoded pattern. In another embodiment, the source of light 562 passes through a slide 554 having an uncoded pattern of dots before passing through a lens 556 and proceeding as an uncoded pattern of light 558. In another embodiment, the light from the light source 552 passes through a lenslet array 554 before being redirected into the pattern 558. In this case, inclusion of the lens 556 is optional.

The actuators 522, 534, also referred to as beam steering mechanisms, may be any of several types such as a piezo actuator, a microelectromechanical system (MEMS) device, a magnetic coil, or a solid-state deflector.

Figure 6A:
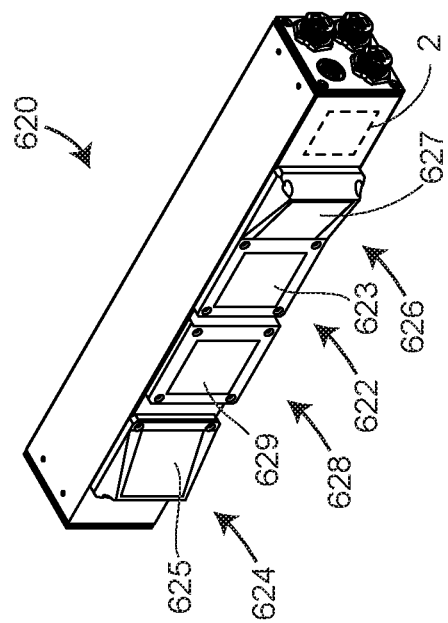
FIG. 6A is an isometric view of a triangulation scanner having two projectors and one camera according to an embodiment of the present invention.

FIG. 6A is an isometric view of a triangulation scanner 600 that includes a single camera 602 and two projectors 604, 606, these having windows 603, 605, 607, respectively. In the system 600, the projected uncoded spots by the projectors 604, 606 are distinguished by the camera 602. This may be the result of a difference in a characteristic in the uncoded projected spots. For example, the spots projected by the projector 604 may be a different color than the spots projected by the projector 606 if the camera 602 is a color camera. In another embodiment, the triangulation scanner 600 and the object under test are stationary during a measurement, which enables images projected by the projectors 604, 606 to be collected sequentially by the camera 602. The methods of determining correspondence among uncoded spots and afterwards in determining 3D coordinates are the same as those described earlier in FIG. 2 for the case of two cameras and one projector. In an embodiment, the system 600 includes a processor 2 that carries out computational tasks such as determining correspondence among uncoded spots in projected and image planes and in determining 3D coordinates of the projected spots.

Figure 6B:
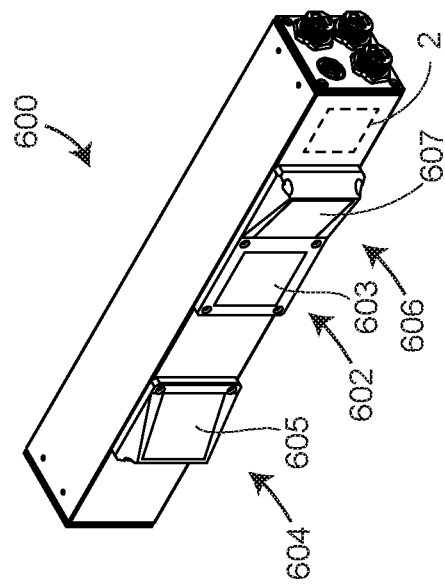
FIG. 6B is an isometric view of a triangulation scanner having three cameras and one projector according to an embodiment of the present invention.

FIG. 6B is an isometric view of a triangulation scanner 620 that includes a projector 622 and in addition includes three cameras: a first camera 624, a second camera 626, and a third camera 628. These aforementioned projector and cameras are covered by windows 623, 625, 627, 629, respectively. In the case of a triangulation scanner having three cameras and one projector, it is possible to determine the 3D coordinates of projected spots of uncoded light without knowing in advance the pattern of dots emitted from the projector. In this case, lines can be drawn from an uncoded spot on an object through the perspective center of each of the three cameras. The drawn lines may each intersect with an uncoded spot on each of the three cameras. Triangulation calculations can then be performed to determine the 3D coordinates of points on the object surface. In an embodiment, the system 620 includes the processor 2 that carries out operational methods such as verifying correspondence among uncoded spots in three image planes and in determining 3D coordinates of projected spots on the object.

Figure 6C:
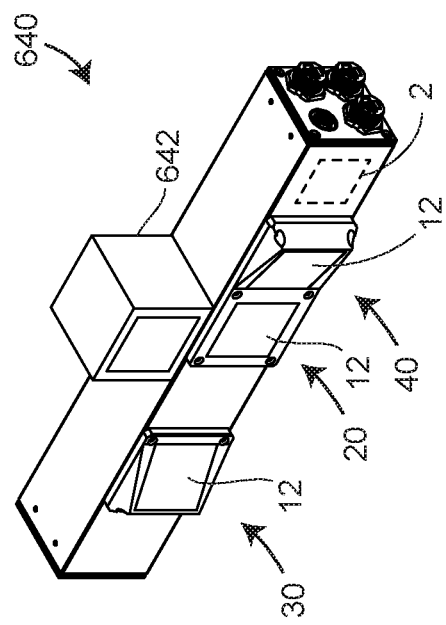
FIG. 6C is an isometric view of a triangulation scanner having one projector and two cameras and further including a camera to assist in registration or colorization according to an embodiment of the present invention.

FIG. 6C is an isometric view of a triangulation scanner 640 like that of FIG. 1A except that it further includes a camera 642, which is coupled to the triangulation scanner 640. In an embodiment the camera 642 is a color camera that provides colorization to the captured 3D image. In a further embodiment, the camera 642 assists in registration when the camera 642 is moved—for example, when moved by an operator or by a robot.

Figure 7A:
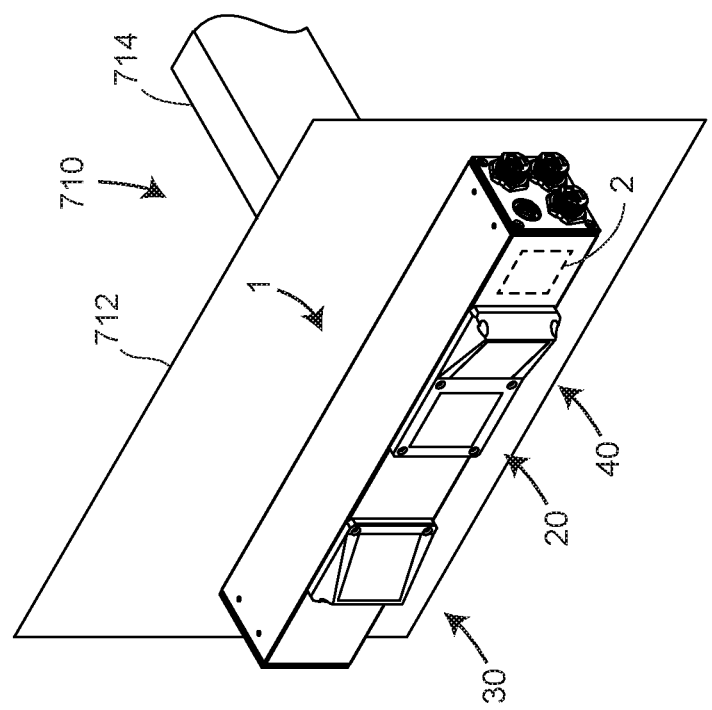
FIG. 7A illustrates a triangulation scanner used to measure an object moving on a conveyor belt according to an embodiment of the present invention.
Figure 7B:
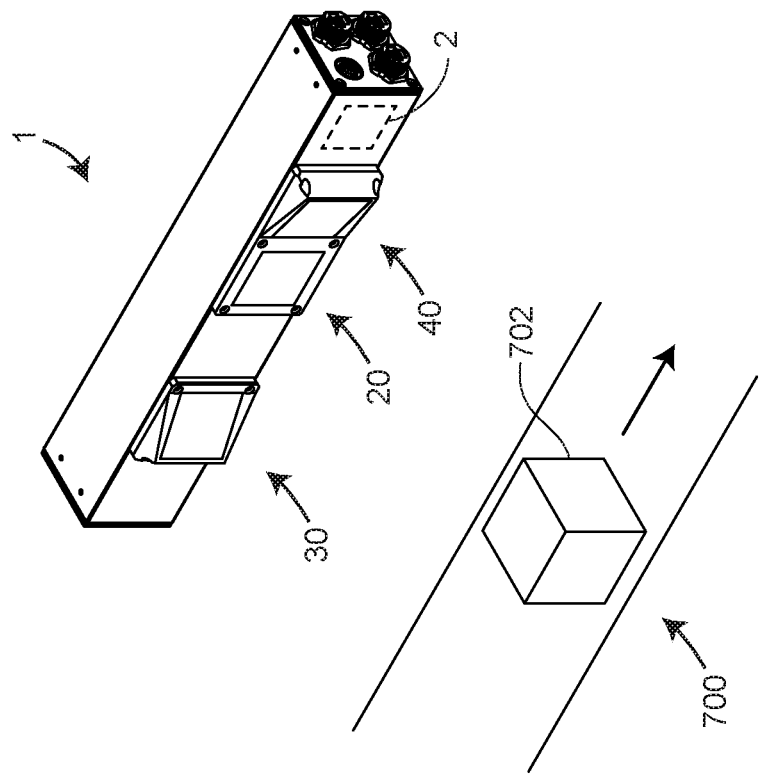
FIG. 7B illustrates a triangulation scanner moved by a robot end effector, according to an embodiment of the present invention.

FIGS. 7A, 7B illustrate two different embodiments for using the triangulation scanner 1 in an automated environment. FIG. 7A illustrates an embodiment in which a scanner 1 is fixed in position and an object under test 702 is moved, such as on a conveyor belt 700 or other transport device. The scanner 1 obtains 3D coordinates for the object 702. In an embodiment, a processor, either internal or external to the scanner 1, further determines whether the object 702 meets its dimensional specifications. In some embodiments, the scanner 1 is fixed in place, such as in a factory or factory cell for example, and used to monitor activities. In one embodiment, the processor 2 monitors whether there is risk of contact with humans from moving equipment in a factory environment and, in response, issue warnings, alarms, or cause equipment to stop moving.

FIG. 7B illustrates an embodiment in which a triangulation scanner 1 is attached to a robot end effector 710, which may include a mounting plate 712 and robot arm 714. The robot may be moved to measure dimensional characteristics of one or more objects under test. In further embodiments, the robot end effector is replaced by another type of moving structure. For example, the triangulation scanner 1 may be mounted on a moving portion of a machine tool.

Figure 8:
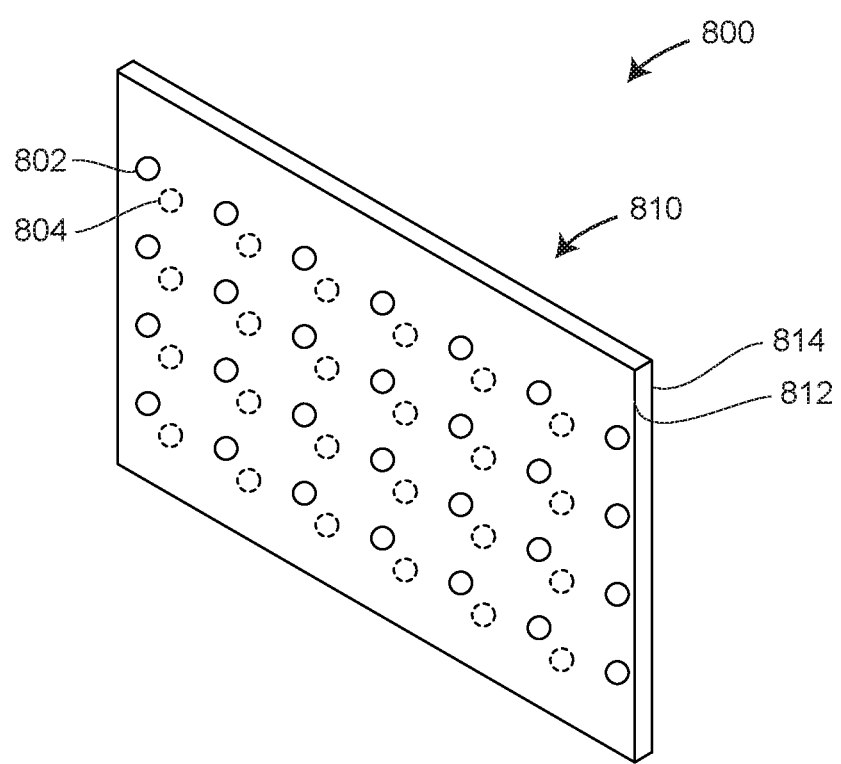
FIG. 8 illustrates front and back reflections off a relatively transparent material such as glass according to an embodiment of the present invention.

FIG. 8 is a schematic isometric drawing of a measurement application 800 that may be suited to the triangulation scanners described herein above. In an embodiment, a triangulation scanner 1 sends uncoded spots of light onto a sheet of translucent or nearly transparent material 810 such as glass. The uncoded spots of light 802 on the glass front surface 812 arrive at an angle to a normal vector of the glass front surface 812. Part of the optical power in the uncoded spots of light 802 pass through the front surface 812, are reflected off the back surface 814 of the glass, and arrive a second time at the front surface 812 to produce reflected spots of light 804, represented in FIG. 8 as dashed circles. Because the uncoded spots of light 802 arrive at an angle with respect to a normal of the front surface 812, the spots of light 804 are shifted laterally with respect to the spots of light 802. If the reflectance of the glass surfaces is relatively high, multiple reflections between the front and back glass surfaces may be picked up by the triangulation scanner 1.

The uncoded spots of lights 802 at the front surface 812 satisfy the criterion described with respect to FIG. 2 in being intersected by lines drawn through perspective centers of the projector and two cameras of the scanner. For example, consider the case in which in FIG. 2 the element 250 is a projector, the elements 210, 230 are cameras, and the object surface 270 represents the glass front surface 270. In FIG. 2, the projector 250 sends light from a point 253 through the perspective center 258 onto the object 270 at the position 272. Let the point 253 represent the center of a spot of light 802 in FIG. 8. The object point 272 passes through the perspective center 218 of the first camera onto the first image point 220. It also passes through the perspective center 238 of the second camera 230 onto the second image point 235. The image points 200, 235 represent points at the center of the uncoded spots 802. By this method, the correspondence in the projector and two cameras is confirmed for an uncoded spot 802 on the glass front surface 812. However, for the spots of light 804 on the front surface that first reflect off the back surface, there is no projector spot that corresponds to the imaged spots. In other words, in the representation of FIG. 2, there is no condition in which the lines 211, 231, 251 intersect in a single point 272 for the reflected spot 204. Hence, using this method, the spots at the front surface may be distinguished from the spots at the back surface, which is to say that the 3D coordinates of the front surface are determined without contamination by reflections from the back surface. This is possible as long as the thickness of the glass is large enough and the glass is tilted enough relative to normal incidence. Separation of points reflected off front and back glass surfaces is further enhanced by a relatively wide spacing of uncoded spots in the projected uncoded pattern as illustrated in FIG. 8. Although the method of FIG. 8 was described with respect to the scanner 1, the method would work equally well for other scanner embodiments such as the scanners 600, 620, 640 of FIGS. 6A, 6B, 6C, respectively.

In some cases, a material that is nearly transparent is also thin, as for example, in the transparent plastic wrap used to enclose a six-pack of bottles as shown in FIGS. 9A, 9B. The images 900A, 900B of FIGS. 9A, 9B, respectively, were obtained from 3D point clouds collected by a triangulation scanner 1 configured to project a sparse pattern of uncoded spots. To better understand the images 900A, 900B, consider for again the situation of FIG. 8 but with the layer of glass made thinner. As the glass is made thinner and thinner, the secondary reflected spots 804 move progressively closer to the incident reflected spots 802. In an embodiment, eventually the spots 802 and spots 804 overlap nearly entirely, such as for light striking the object 810 at near normal incidence. For example, a plastic wrap used to enclose a six-pack of bottles might be 0.025 millimeters thick, while the projected spots of light might be 1.0 millimeter in diameter. In this situation, the spot of light reflected off the back layer of the plastic wrap will almost completely overlap the light reflected off the front layer of the plastic wrap. For the thin plastic covering layer over bottles as illustrated in FIGS. 9A, 9B, a sparsely projected pattern of spots by a scanner such as the scanner 1 produces an image of reflected spots clearly showing the outline of the plastic shape enclosing the six bottles. In the images 900A, 900B, each dark spot represents at least one 3D coordinate. The spots are made large enough in the 2D representation of the images 900A, 900B to provide the viewer with a clear sense of the object, but regions of the images 9A, 9B that are nearly completely black represent a large collection of 3D coordinates. These 3D coordinates are available to a processor tied to the triangulation scanner 1, but even without visually displaying each 3D coordinate in the complete set of 3D coordinates, the images 900A, 900B clearly indicate the curvature of the translucent material. Such images may usefully be employed by robotic machinery designed to move packaged materials.

Figure 10A:
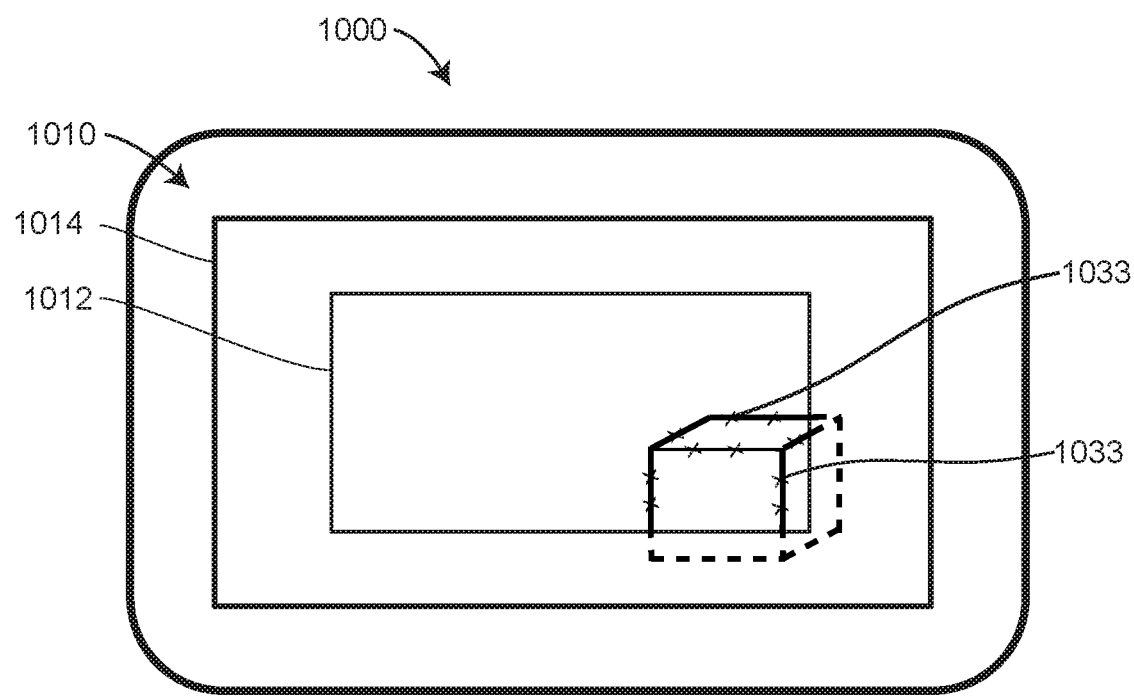
FIG. 10A shows target points of an object captured by a 2D camera to assist in registration according to an embodiment of the present invention.
Figure 10B:
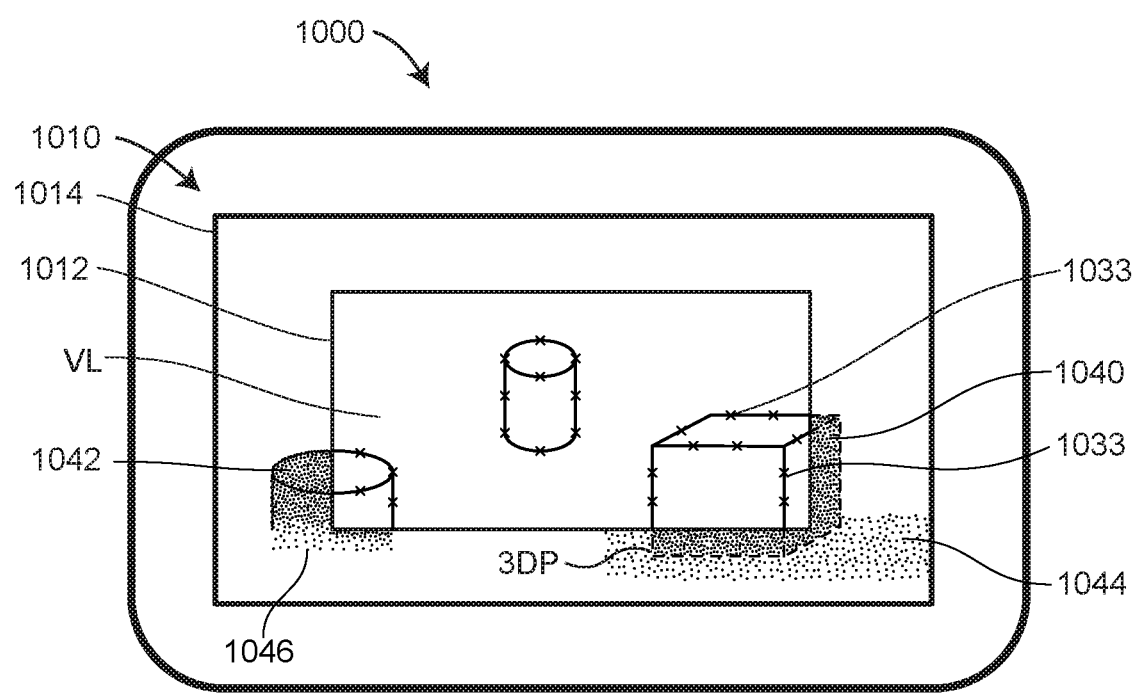
FIG. 10B shows a display representation in which real-time 2D camera data is shown in a central region around which is placed determined 3D point cloud data according to an embodiment of the present invention.

Multiple sets of 3D coordinates obtained by scanners in multiple different poses are said to be registered together when they are put into a common frame of reference. One way to perform such a registration is by observing common interest points or target points with a camera viewing a scene from a plurality of poses, where it is understood that the term pose refers to six degrees-of-freedom in space, including three translational degrees of freedom such as x, y, z and three orientational degrees of freedom such as pitch angle, roll angle, and yaw angle. Examples of cameras that may be used to capture interest points or target points are the camera 390 in the triangulation scanner 300 of FIG. 3 and the camera 642 in the triangulation scanner 640 of FIG. 6C. Interest/target points may be found using a variety of mathematical methods known in the art. Such points are indicated in FIGS. 10A, 10B by the small crosses 1033 placed in the image. In the examples of FIGS. 10A, 10B, the crosses 1033 indicate mainly the edges of objects, but other target points besides points on edges may also be found. Target points may be based on natural features or on artificial targets such as reflective dots placed on or near on object under test. By comparing a sequence of such target points with the camera in a variety of poses, it is possible to determine changes in pose (position and orientation) of the imaged objects, thereby enabling a processor to put collected sets of 3D object coordinates into a common frame of reference. One method for simultaneously displaying real-time 2D image data and accumulated 3D point cloud data is by using a display platform 1000 illustrated in FIG. 10B. Such a display platform 1000 may be for example a tablet, smartphone, laptop computer, or integrated into a scanner assembly.

The display platform 1000 in FIGS. 10A, 10B includes a display 1010 that, in an embodiment, is further subdivided into a first display part 1012 and a second display part 1014. In an embodiment, the first display part 1012 is a (rectangular) central part of the display 1010, and the second display part 1014 encompasses a peripheral area around the first display part 1012. In another embodiment, the two display parts are columns. In other embodiments, the first display part has a circular, square, trapezoidal, polygonal, or user-selectable shape.

In an embodiment, a video live image VL is displayed in the first display part 1012. Such a video live image might be captured by the 2D camera 390 or 642, for example. In the second display part 1014, an image of the latest 3D point cloud (or accumulated and registered 3D point clouds) is displayed. The 3D point cloud displayed within the region 1014 may be a portion of the total accumulated point cloud. As video live image VL changes, such as when the user moves the scanner 300 or 640, the image of the three-dimensional point cloud 3DP changes correspondingly to reflect the change in position and orientation of the scanner 300 or 640. One method of determining whether additional scanning is desired in a given area is by observing the densities in the accumulated point clouds in different parts of the second display part 1014. For example, the user may note the relatively high densities in the regions 1042, 1044 compared to the regions 1044, 1046.

Figure 11A:
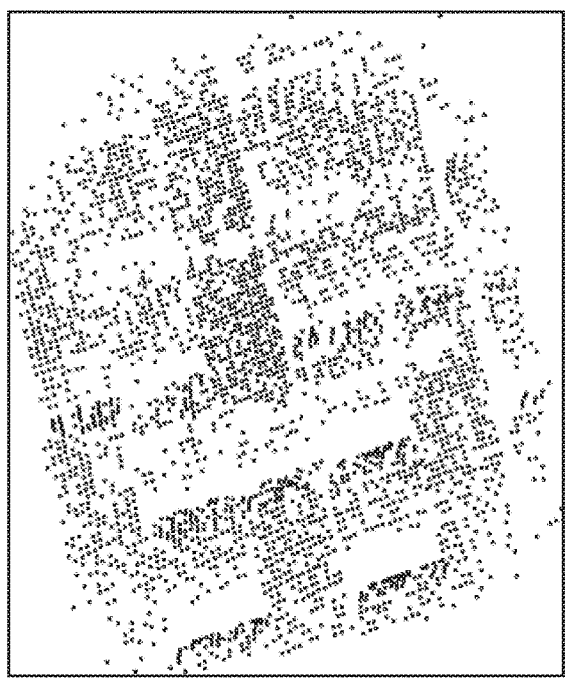
FIGS. 11A, 11B are displays of point cloud data captured in a first instant and a second instant, respectively.
Figure 11B:
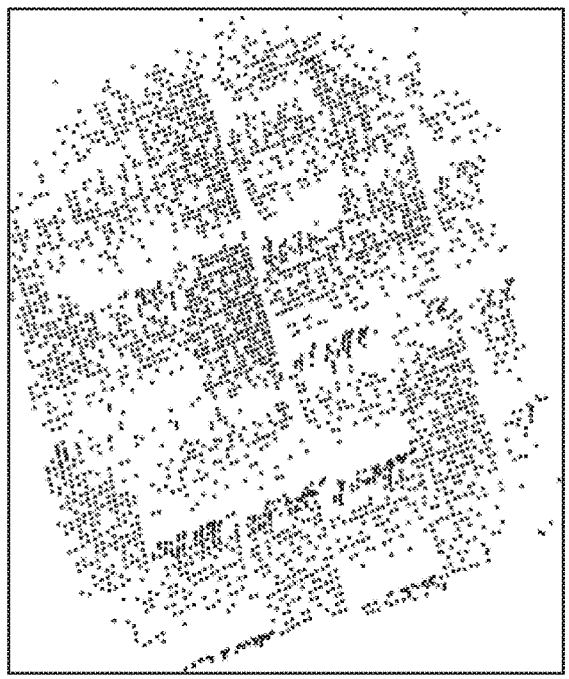
Figure 11C:
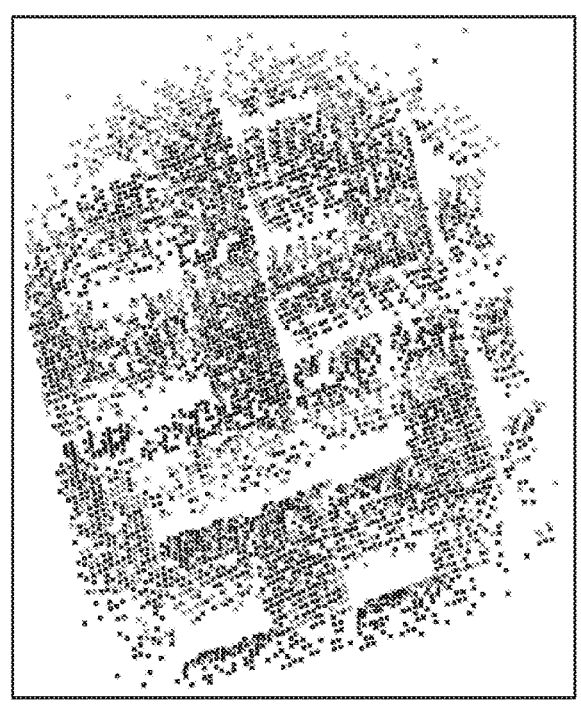
FIG. 11C is a display of registered point cloud data captured in the first and the second instants according to an embodiment of the present invention.
Figure 11C:
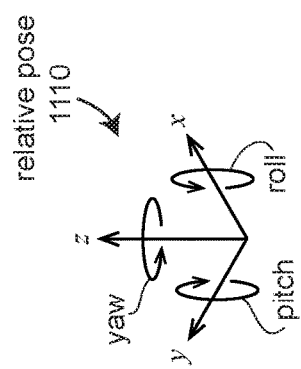

In an embodiment, a scanner such as the scanner 1 in FIGS. 1A, 1B, 1C, 1D, 1E or the scanner 300 in FIG. 3 may perform registration of sequentially collected 3D point clouds by noting the changes in the distribution of 3D coordinates in successively collected 3D point clouds to determine a change in six DOF pose based on three degrees of translational freedom (e.g., x, y, z) and three degrees of orientational freedom (e.g., roll angle, pitch angle, and yaw angle). Some possible methods for performing such registration are illustrated in FIGS. 11A, 11B, 11C, 11D, 11E, 11F, 11G, 11H, 11J. The FIGS. 11A, 11B show 3D point clouds 1100, 1102, respectively, collected from a scanner such as scanner 1. In an embodiment, the projected points are relatively sparsely spaced, for example, in an uncoded pattern of uncoded spots arranged in rectangular array of 80×80 spots. In an embodiment, the frame rate is 70 Hertz, with 14.3 milliseconds between successive frames. In this situation, it is ordinarily relatively easy to track each 3D point in successive frames. The image 1104 of FIG. 11C shows the 3D point cloud 1102 of FIG. 11B, with imaged spots shown in gray, superimposed on the point cloud 1100 of FIG. 11A, with imaged spots shown in black. The movement of the gray spots relative to the black spots in clearly evident in FIG. 11C. In the example of FIGS. 11A, 11B, there is a relatively large amount of 3D structure in the object captured in the point clouds. In this case, an optimization procedure may be performed to adjust the six degrees of freedom of the relative pose 1110. Such an optimization procedure may be performed for example using a least squares optimization, adjusting the x, y, z, roll, pitch, and yaw until the summed square of deviation of the 3D points from a relatively smooth underlying surface is minimized. Many other optimizations are possible—for example, a method based on the Iterative Closest Approach (ICP) algorithm, and any of these optimizations may be used.

Further situations in which the relative pose between successive frames may be determined are now described in reference to FIGS. 11D, 11E, 11F, 11G, 11H, 11J. FIGS. 11D, 11E depict the situation in which an uncoded pattern of uncoded spots is projected onto an object 1120 in first instance 1122 and a second instance 1123, respectively. The object 1120 includes a 3D feature that includes a corner point 1125 common to each of three surfaces 1127, 1128, 1129. The circles, crosses, and dashes are shown to depict 3D coordinates that lie on each of the surfaces 1127, 1128, 1129, respectively. With the amount of 3D structure in the object 1120, an optimization, such as a least squares optimization, may be performed to determine the relative change in pose from the first instance 1122 to the second instance 1123, thereby enabling the successively acquired point clouds to be registered.

A relatively difficult case for determining a relative change in pose between successive scans occurs when the scanner is measuring a flat planar surface 1130 having no distinguishing features. One way around this problem is illustrated in FIGS. 11F, 11G. In an embodiment, three or more markers 1135, 1136, 1137, which might be reflective spots, for example, are placed on the surface 1130 or off the surface 1130 but still visible to the cameras of a scanner such as the scanner 1. In an embodiment, spots are projected onto the object 1130 in a first instance 1132 and a second instance 1133, respectively. The 3D coordinates of the spots determined by the scanner in the first instance and the second instance is sufficient information for a processor to determine the relative change in pose 1110 between the first instance 1132 and the second instance 1133. This further enables the 3D point clouds obtained in FIGS. 11F, 11G to be registered together. If the surface 1130 is not exactly planar but includes three or more distinguishable natural features 1135, 1136, 1137, then those natural features provide the information used to determine the relative change in pose 1110, thereby enabling registration of the point clouds obtained in the first instance 1132 and the second instance 1133.

FIGS. 11H, 11J again illustrate the case of a relatively difficult to measure surface such as a flat planar surface 1130 having no distinguishing features. In an embodiment, three or more spots of light 1145, 1146, 1147 are projected by an external projector 1149 onto the planar surface 1130. The projected spots of light 1145, 1146, 1147 are seen by the cameras of a scanner such as the scanner 1. Hence the projected spots of light 1145, 1146, 1147 serve the same function as the markers 1135, 1136, 1137, enabling the relative change in the pose 1110 to be determined and 3D point clouds obtained in a first instance 1142 and a second instance 1143 to be registered. This approach may be used, for example, when the object under test and the external projector are both held fixed while the scanner such as the scanner 1 or 300 is moved. Such movement of the scanner may occur, for example, if the scanner is handheld or mounted on a robot end effector.

Figure 12B:
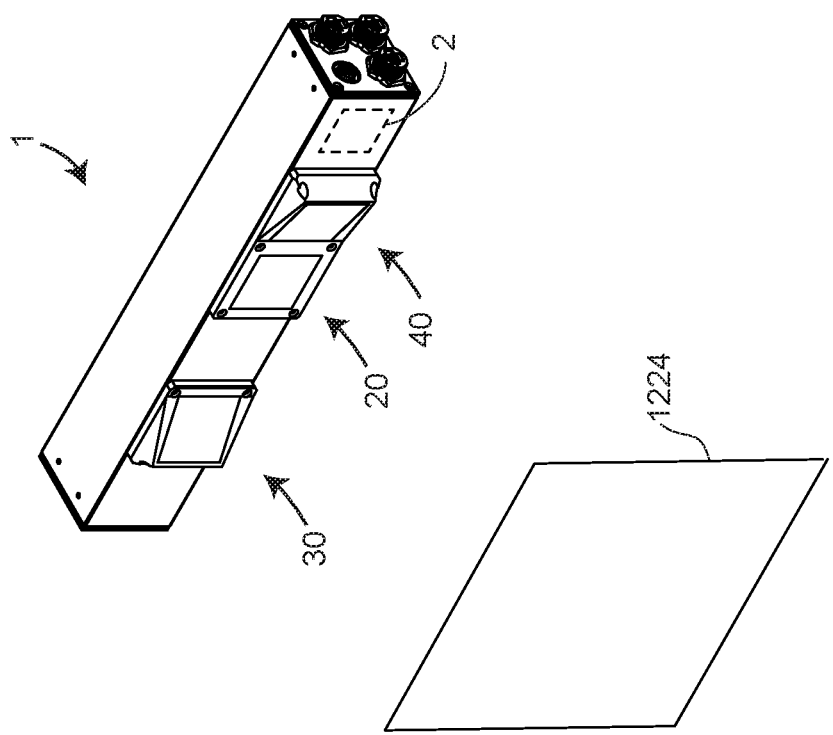
FIG. 12B illustrates a triangulation scanner determining calibration parameters based on reference artifacts according to an embodiment of the present invention.
Figure 12A:
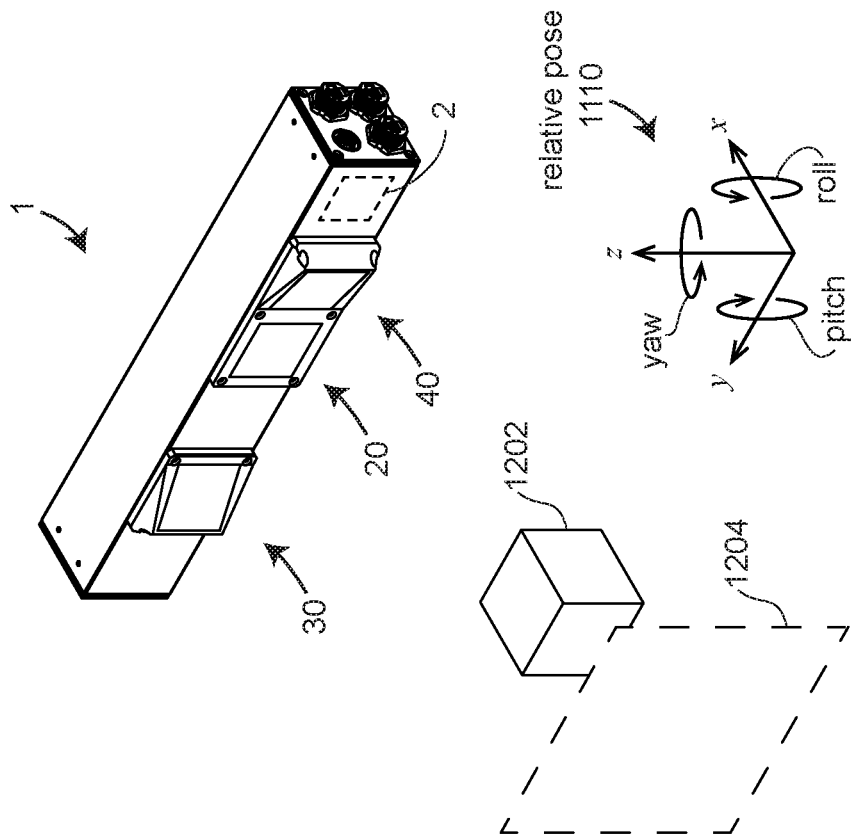
FIG. 12A illustrates a triangulation scanner determining pose of an object based at least in part on background objects according to an embodiment of the present invention.

In some cases, background objects may be used to assist in registering successive scans. For example, suppose that the scanner 1 in FIG. 12A is used to measure an object 1202. In an embodiment, the object 1202 is moving on a conveyor belt while the scanner is stationary. In another embodiment, the object 1202 is stationary while the scanner 1 is moved, for example by a robot end effector or in a handheld mode by an operator. In either case, the relative motion between the scanner 1 and the object 1202 will result in relative movement of the background objects 1204 becoming visible. The background objects, of which one or several may be present, are represented schematically by the dashed box 1204. The presence of visible and stationary objects 1204 assists in obtaining registration of successively collected point clouds.

In some cases, a compensation or calibration is may be desired for a scanner or of an industrial system used with the scanner, such as a robot. A compensation or calibration of a scanner 1 shown in FIG. 12B may be performed to determine compensation parameters for the accurate performance of the scanner, or they may be used to verify performance of a standard to a manufacturer's specifications. The periodic adjustment of compensation parameters may result, for example, from thermal expansion of materials within the scanner or by mechanical changes in the scanner, possibly as a result of mechanical shock. Likewise, a scanner 1 may be attached to a robot end effector to provide accurate guidance and navigation for a robot. In most cases, although robots have sensors such as angular encoders to help move its end effector to prescribed positions, in most cases, the overall steering accuracy of the robotic system is not very accurate compared to the scanner 1. Hence, the scanner 1 may provide a cost effective way to guide a robotic system. In FIG. 12B, reference artifacts 1224 are used by the scanner for compensation or calibration.

Figure 12D:
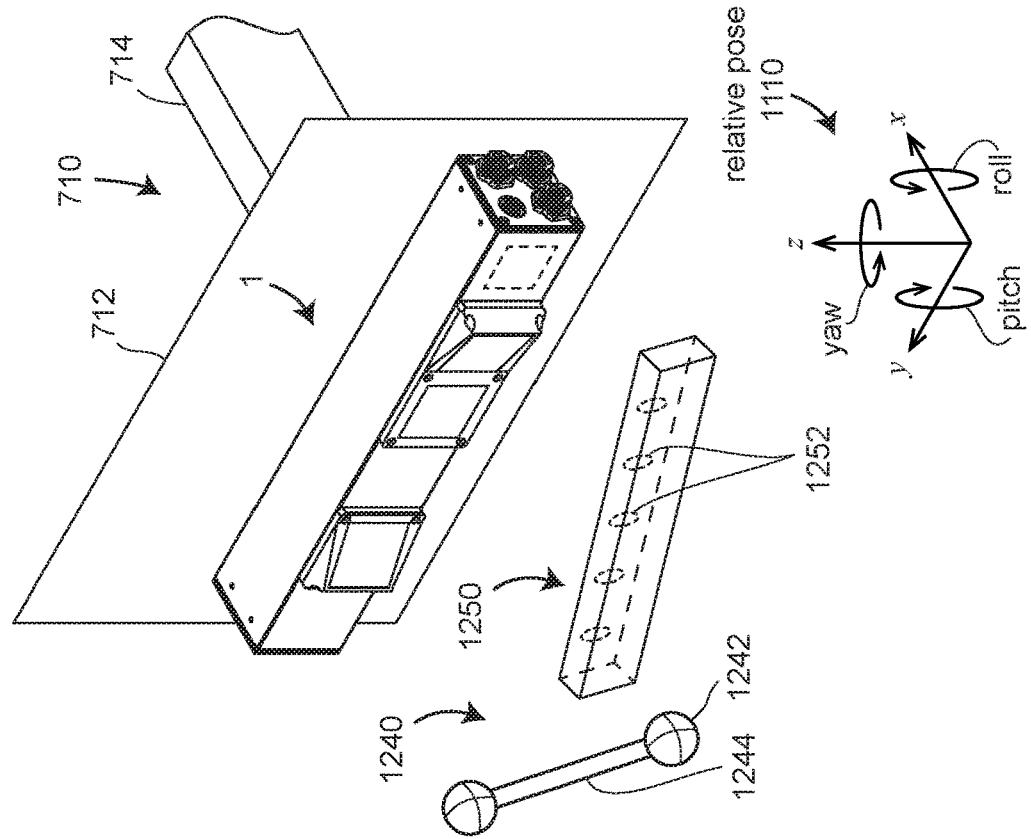
FIGS. 12C, 12D illustrate a triangulation scanner determining calibration parameters based on particular types of reference artifacts according to embodiments of the present invention.
Figure 12C:
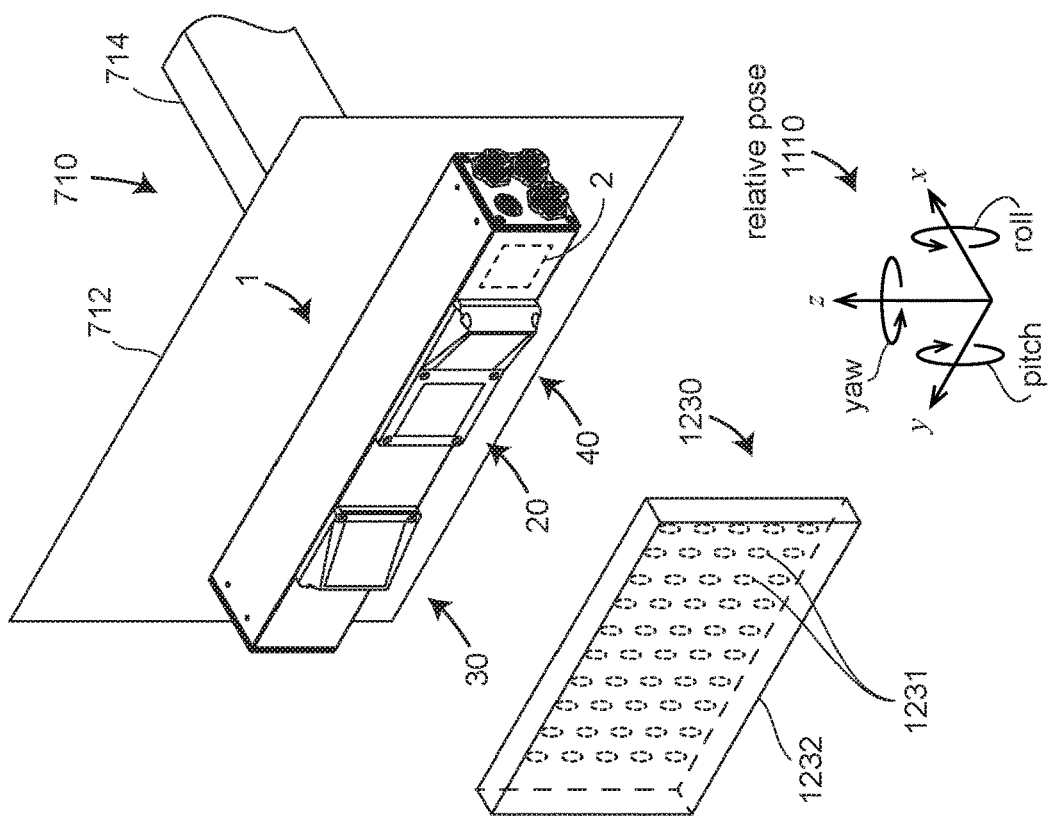

Specific examples of reference artifacts 1224 are now described in reference to FIGS. 12C, 12D. A scanner such as the scanner 1 is attached to a robot end effector 710, which may include a mounting plate 712 and robot arm 714. In an embodiment, the robot includes a collection of articulated arm segments that move the end effector 710 to a desired location. In another embodiment, the robot is a non-articulated structure such as a machine tool that moves the end effector in a prescribed manner. In an embodiment, the scanner periodically measures a calibration plate 1230 that includes a collection of reflective dots 1231 placed at calibrated locations on a rigid material 1232 having a low coefficient of thermal expansion (CTE). For example, the rigid material 1232 may be a low-CTE carbon fiber composite material having a coefficient of thermal expansion of less than 1.0 micrometer/meter/degree Celsius. In an embodiment, in a calibration or compensation procedure, the end effector 710 may tilt and translate the scanner 1 to several slightly different positions to image the calibration plate. By comparing the images captured by the cameras 30, 40 of the calibration plate from the slightly different positions and angles, compensation parameters for the scanner may be determined. Such compensation parameters may include corrections for the camera compensation parameters related to camera aberrations such as distortion. The compensation parameters may also include values to correction for the relative pose of the projector 20, camera 30, and camera 40. Examples of such pose corrections are corrections for the baselines $B_1$, $B_2$, and $B_3$ as shown in FIG. 2. Compensation parameters may also account for changes in robot mechanics and sensors. For example, compensations may be used for "zero angles" associated with each angular encoder in a robot joint. Further compensations may be used for the temperature-dependent lengths of the robot arms.

Besides periodic compensation, field checks or calibrations may also be performed. Field checks and calibrations are performed periodically to ensure that the scanner sensor or robotic system is performing as desired or as expected. The calibration plate provides a way of checking or calibrating the system as well as for determining compensation parameters to improve system performance.

Two other types of artifacts shown in FIG. 12D may also be used for compensation and calibration. The ball bar 1240 includes two or more balls 1242 having a calibrated reference diameter and attached to a central shaft 1244, with the balls 1242 separated by a calibrated reference distance. By measuring points on the surface of each sphere, the scanner 1 may determine the diameter of each ball 1242 and the distance between the balls. Another artifact that may be used is a scale bar 1250. A scale bar is a bar having a number of markers 1252, each separated by a calibrated reference distance. In some situations, the scale bar 1250 may be relatively very long. In an embodiment, the scanner measures the long scale bar in conjunction with relatively large objects. In an embodiment, the scale-bar readings obtained by the scanner 1 over the relatively large length of the scale bar are used together to assist in registering point clouds obtained in measuring the large objects.

Figure 12F:
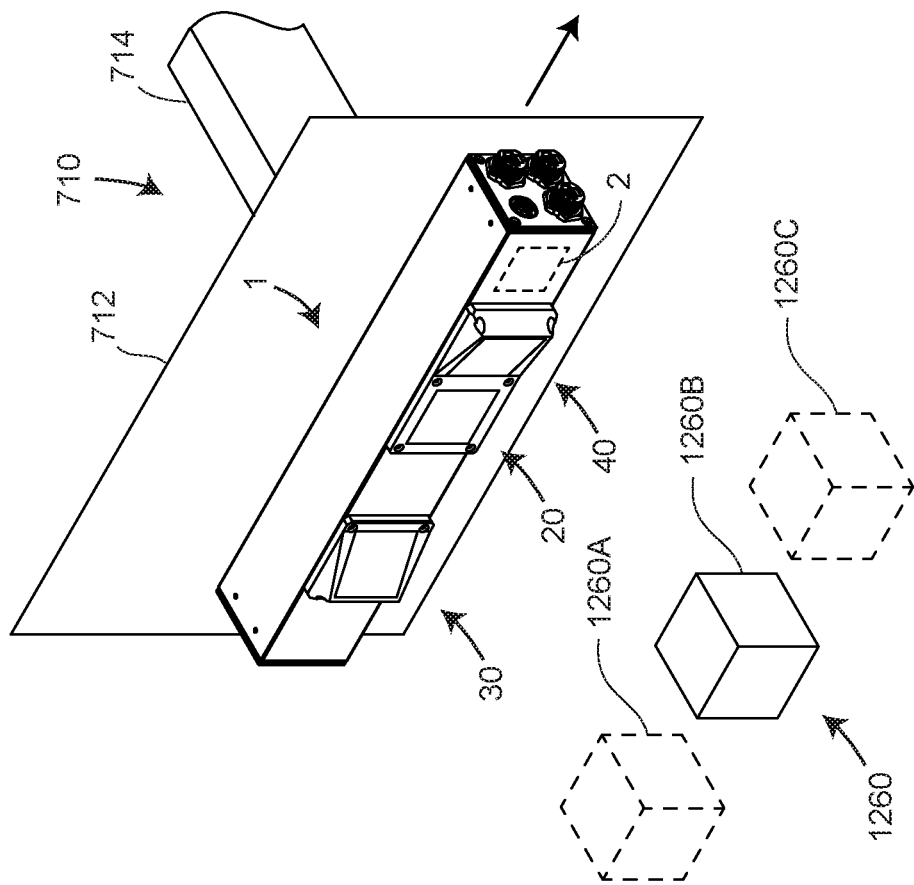
FIGS. 12E, 12F illustrate a triangulation scanner registering together multiple 3D images obtained of an object moving on a conveyor belt and of a stationary object captured with the scanner on a robot end effector, respectively, according to embodiments of the present invention.
Figure 12E:
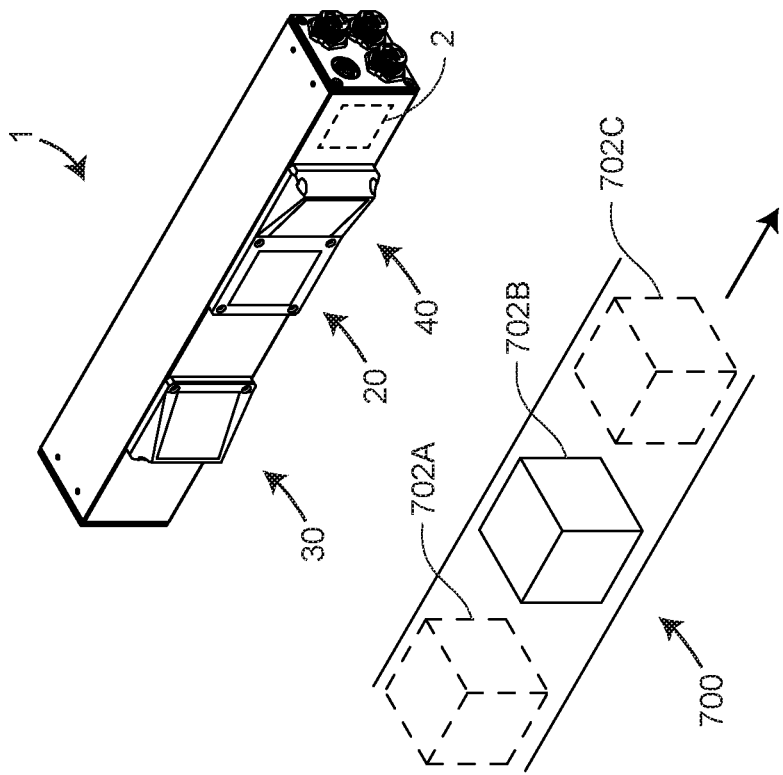

In an embodiment illustrated in FIGS. 12E, 12F, the scanner 1 is used in combination with a conveyor belt 700 or a robot end effector 710. In an embodiment, the scanner 1 captures, in a plurality of 3D point clouds, an object moving on a conveyor belt 700. In an embodiment, the plurality of 3D point clouds are registered together in a common frame of reference as discussed above in reference to FIGS. 11A, 11B, 11C. As a result, the object 700 in FIG. 7A is captured in several positions such as 702A, 702B, 702C. When the 3D point clouds are registered together, the object 700 is seen from multiple perspectives, thereby increasing the captured volume of the resulting 3D representation. In addition, the scanner 1 may be used to determine an elapsed time between the positions 702A, 702B, 702C. In an embodiment, this timing information is used to provide synchronization signals to the conveyor belt or other process.

In an embodiment, the moving scanner 1, which is attached to a robot end effector 710, captures an object 1260 in a plurality of positions 1260A, 1260B, 1260C. In an embodiment, the plurality of 3D point clouds are registered together in a common frame of reference as discussed above in reference to FIGS. 11A, 11B, 11C. When the 3D point clouds are registered together, the object 1200 is seen from multiple perspectives, thereby increasing the capture volume of the resulting 3D representation. In addition, the scanner 1 may be used to determine an elapsed time between the positions 1260A, 1260B, 1260C. In an embodiment, this timing information is used to provide synchronization signals to the robot end effector 710 or other process.

As used herein, a human-centric robot having an end-effector 710 is a robotic device that is configured to operate autonomously or semi-autonomously in close proximity to a human operator. As used herein, the phrase "close proximity" means that the human-centric robot and the operator are positioned such that portions of the human-centric robot may move within areas that overlap with the human operator during operations. The human-centric robot may also be referred to as a human-friendly, a collaborative robot or a human collaborative robot. As such, the human-centric robot may include one or more sensors, such as sensor for example, that determines whether the operator and human-centric robot are positioned such that a moving part of the human-centric robot is within a predetermined distance of the human operator such that there is a risk of contact. In an embodiment, a controller is configured to alter the speed or movement of the human-centric robot to either avoid contact or reduce the force on the human operator in the event of contact. In one or more embodiments, the human-centric robot is configured to have a velocity at the point of contact of less than or equal to 25 meters/second, a maximum dynamic power of less than or equal to 80 Watts, or a maximum static force of less than or equal to 150 Newton.

In an embodiment, the scanner 1 transmits a position signal that allows the determination of the relative positions of the human operator and the human-centric robot. In the exemplary embodiment, the position signal is not a function of the environmental or ambient lighting. In other words, the position signal is determined independently of the environmental light conditions. In an embodiment, an assessment is made by a processor as to whether an operator working in the vicinity of the robot is in danger of interacting with the robotic mechanism. In an embodiment, a probably of interaction of the operator with the robot is determined based at least in part on a change in pose of the robot end effector from a first instance in which the robot has a first pose to a second instance in which the robot has a second pose. This is done by determining a probably of interaction that includes the operator, the probably of interaction being based at least in part on the change in the pose of the triangulation scanner 1 from the first instance to the second instance. In an embodiment, the change in pose is based in a change in the captured 3D coordinates of the point clouds in the first instance and the second instance as illustrated in FIGS. 11A, 11B, 11C.

Figure 13A:
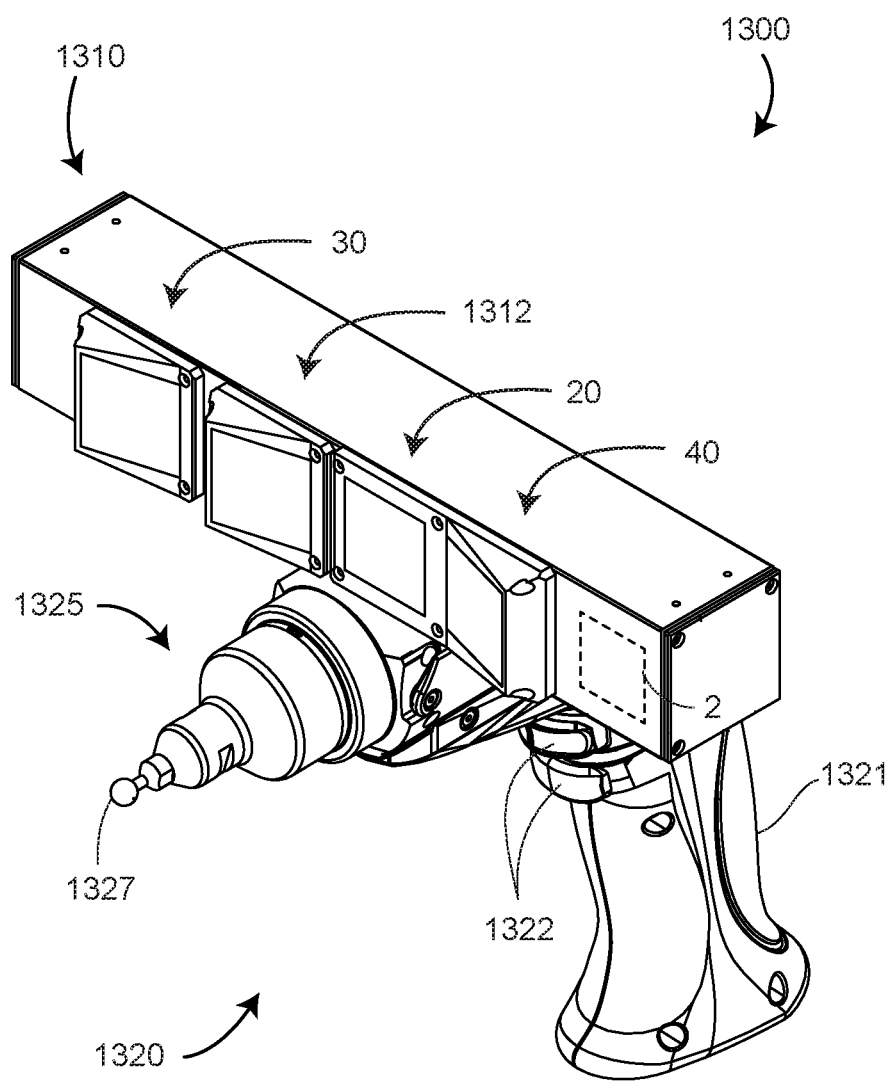
FIG. 13A illustrates a handheld triangulation scanner and tactile probe according to an embodiment of the present invention.

In an embodiment, a 3D measuring device 1300 includes a scanner 1310 and a probe assembly 1320. In an embodiment illustrated in FIG. 13A, a handheld 3D measuring device 1310 includes the scanner 1310 attached to a handle assembly 1320. In an embodiment, the probe assembly 1320 includes a handle 1321, buttons/actuators 1322 for starting or stopping measurements or giving other instructions, and a tactile probe assembly 1325. The probe assembly 1325 includes a probe tip 1327 that an operator may hold in contact with a point to be measured in three dimensions. The probe tip may extend a relatively short distance from the scanner 1310, as shown in FIG. 13A, or it may extend farther from the scanner, for example, by attaching the probe tip 1327 to a relatively long stylus. The probe tip may also be angled downward or otherwise directed. For the case in which the probe tip 1327 is placed relatively close to the scanner 1310, an additional camera 1312 may be added to cooperate with the camera 40 in visualizing the probe tip 1327 in relation to the uncoded spots of light projected by the projector 20. In other embodiments, the probe assembly 1325 does not include a probe tip and instead relies entirely on the scanner 1310 to obtain 3D measurements. In embodiments, any of the registration methods shown in FIGS. 11A, 11B, 11C, 11D, 11E, 11F, 11G, 11H, 11J may be used to register the multiple 3D point clouds and 3D points measured with the probe tip 1327 obtained as the operator moves the 3D measuring device 1300 from position to position. In another embodiment, an additional camera may be added to the scanner 1310 to provide 2D measurements to assist in registering multiple point clouds, as described in relation to FIGS. 10A, 10B. In an embodiment, the camera 1312 is used for registration rather than for triangulation.

FIG. 13B illustrates a 3D measuring system 1330 having improved 3D measuring performance compared to the measuring device 1300, such as when measuring over relatively large volumes. In an embodiment, the 3D measuring device 1330 includes a 3D measuring device 1300A, a laser tracker 1330, a spherically mounted retroreflector (SMR) 1350, and a magnetic nest 1370. In an embodiment, the triangulation scanner 1300A is like the triangulation scanner 1300 except without the camera 1312. However, the 3D measuring device 1300A could be replaced by the 3D measuring device 1300. Likewise, the scanner in the 3D measuring device 1300A could be replaced by any of the scanners shown in FIGS. 1A, 1B, 1C, 1D, 1E, 3, 6A, 6B, 6C or variations of these. In FIG. 13B, the laser tracker 1340 emits a light beam, which it ordinarily steers to the vertex of a retroreflector. In the embodiment illustrated in FIG. 13B, the retroreflector is the SMR 1350, although any type of retroreflector could be used. In an embodiment, the SMR 1350 is held in place by a magnetic nest 1370 affixed to the 3D measuring device 1310A. In an embodiment, the outer surface 1352 of the SMR 1350 is spherical and made of a non-corrosive, ferromagnetic metal. In an embodiment, a cube-corner retroreflector 1360 is embedded within the spherical outer surface 1352. In an embodiment, the cube-corner retroreflector 1360 includes three first-surface mirrors 1362, each mutually perpendicular to the other two mirrors, and each joined at a common intersection point referred to as the vertex 1354. In an embodiment, the vertex 1354 is placed in the spherical center of the spherical outer surface 1352. In an embodiment, the magnetic nest 1370 is a kinematic nest that holds the center of the SMR 1350 in a constant position, even after being removed from the nest 1370 and then being replaced back in the nest. In an embodiment, the laser tracker steers the beam of light 1342 to the vertex 1354. At each position, the laser tracker 1340 measures the distance to the vertex 1354, and it also measures the vertical and horizontal angles to which the beam of light 1342 is directed about the ideal rotational center (gimbal point) of the tracker 1340. Hence, using the measured distance and two measured angles, the tracker 1340 is able to determine the 3D coordinates of the retroreflector vertex 1354. The SMR 1350 can be rotated within the magnetic nest 1370 to any direction, thereby making it easy for the laser tracker 1340 to track the SMR when turned to almost any angle.

The laser tracker 1340 is a relatively accurate 3D measuring instrument that ordinarily determines the 3D coordinates of the vertex 1354 to within one or two thousandths of an inch (0.025 to 0.050 millimeters) to a range of 20 meters or more. In other words, the laser tracker determines the translational movement of the 3D measuring device 1300A to a relatively high translational (x, y, z) accuracy. While measuring at relatively close ranges (for example, ordinarily a maximum range of anywhere from 0.2 meter to 3.5 meters), the accuracy of the 3D measuring device 1300A is relatively high and registration of multiple 3D data sets may be performed using any of the methods described previously. This combined use of the laser tracker 1340 and retroreflector 1350 with the 3D measuring device 1300A (or similar device) enables the relatively high accuracy to be obtained by the 3D measuring device 1300A at close range. Likewise, the ability of the 3D measuring device 1300A to accurately register the scanner 1310A in the three orientational degrees of freedom (such as pitch angle, yaw angle, and roll angle) makes the 3D measuring system 1330 of FIG. 13B a relatively flexible and accurate measuring system capable of quickly measuring large volumes.

Figure 14:
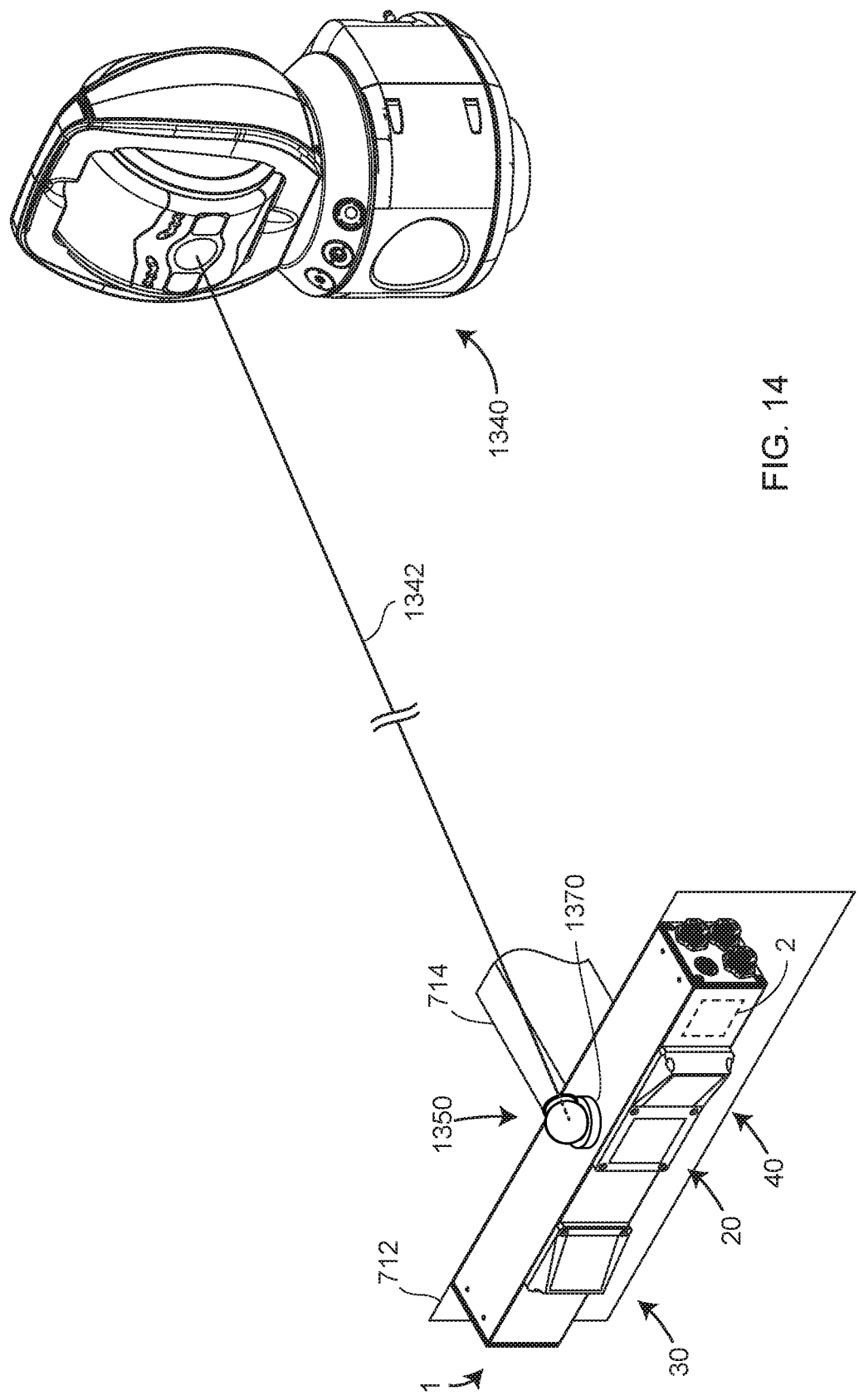
FIG. 14 is an isometric view of a laser tracker used to track a scanner attached to a robotic mechanism according to an embodiment of the present invention.

FIG. 14 illustrates an embodiment in which a triangulation scanner 1 is attached to a robot end effector 710, which may include a mounting plate 712 and robot arm 714. In an embodiment, the robot includes a collection of articulated arm segments that move the end effector 710 to a desired location. In another embodiment, the robot is a non-articulated structure such as a machine tool that moves the end effector in a prescribed manner. In the embodiment illustrated in FIG. 14, an SMR 1350 and magnetic nest 1370 are attached to the robot end effector 710 to enable the laser tracker 740 to accurately track and measure the location (x, y, z) of the SMR 1350.

Figure 15A:
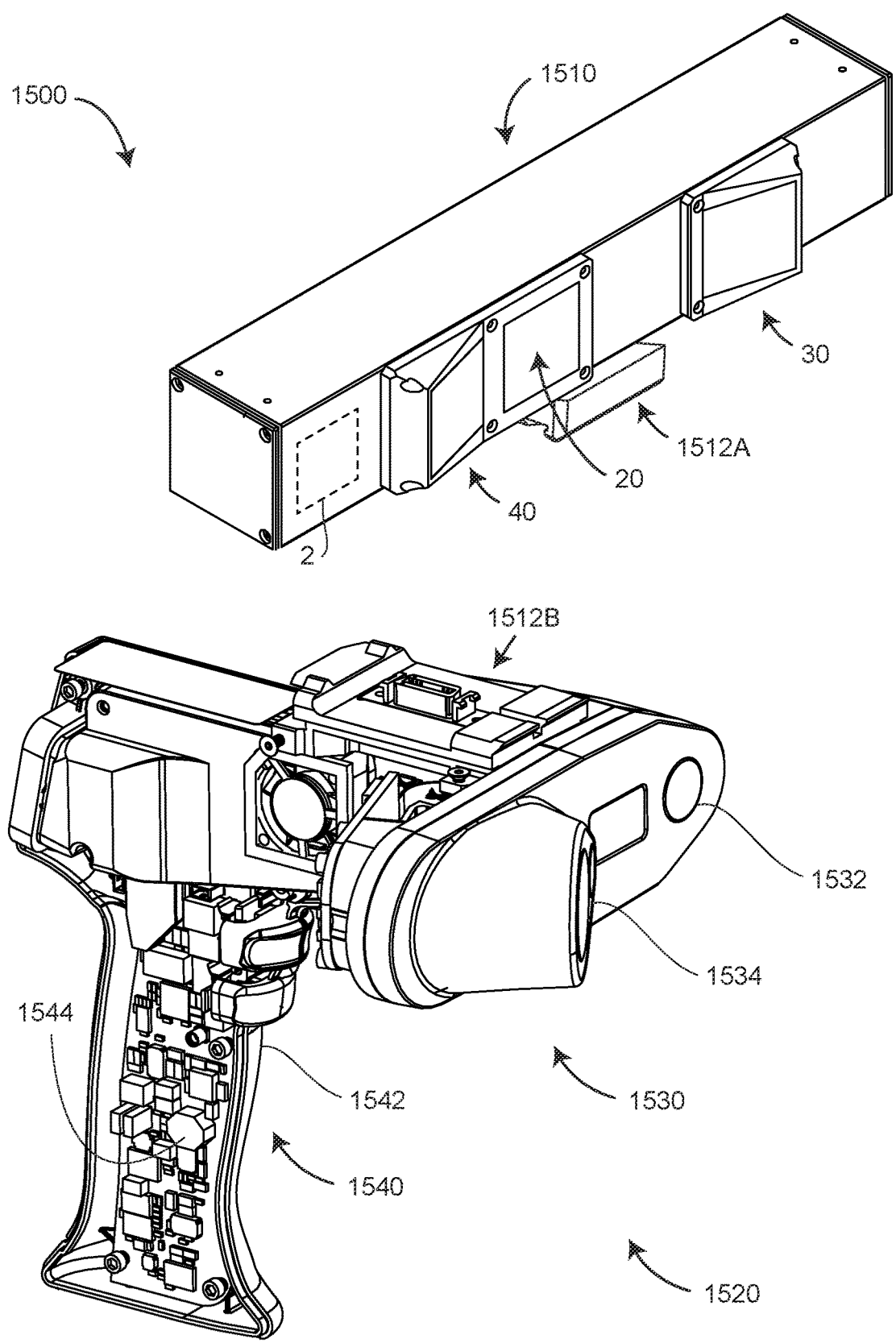
FIG. 15A is a partially exploded and partially cut-away view of a 3D measuring device that combines a line scanner with an area scanner according to an embodiment of the present invention.

FIG. 15A illustrates an embodiment in which a 3D measuring system 1500 includes an area triangulation scanner 1510 and a line scanner 1520. In an embodiment, the line scanner 1520, also known as a laser line probe (LLP) includes a combination mechanical/electrical connector 1512B though which it may be attached to other devices such as an articulated arm coordinate measuring machine, for example. In the embodiment of FIG. 15A, the triangulation scanner 1510 includes a combination mechanical/electrical connector 1512A that locks to the connector 1512B to provide mechanical rigidity between the two units and to transfer electrical signals between the units 1510, 1520. In an embodiment, the line scanner includes a handle 1540 having a handle cover 1542, half of which has been removed to show electrical circuitry 1544 enclosed within the handle 1540. The line scanner 1520 also includes line-scanning triangulation assembly 1530 that includes a line projector 1532 and a camera 1534. In an embodiment, the line scanner emits a line of light onto an object, an image of which is picked up by the 2D camera 1534. The 3D coordinates of object points intersected by the line of light are determined by a processor using the method of triangulation. The processor might reside within the electrical circuitry 1544 or be external to the scanner, for example, in a networked computing system.

In an embodiment, the 3D coordinates obtained by the 3D measuring device 1510 are used to register the multiple lines of 3D coordinates obtained by the line scanner 1520. The line scanner 1520 is relatively accurate. For example, in some systems, the line scanner 1520 may collect around one million 3D points each second, with a relatively high accuracy of one to two thousandths of an inch (0.025 mm to 0.05 mm) obtained for the collected points. By registering the multiple 3D line coordinates with the 3D measuring device 1510, a relatively accurate registered point cloud of 3D coordinates can be obtained. This is particularly true if the laser line probe in moved in two different, overlapping directions at different times. For example, the line scanner 1520 may be moved in a first direction to capture points over a number of lines and then moved in a second direction approximately perpendicular to the first direction to collect many more lines. By collecting points in this manner and then post-processing the data (with possibly a relatively small delay in presenting the final 3D coordinates), registration accuracy can be improved, yielding a relatively high accuracy and dense cloud of points. Some line scanners 1520 are also known to collect 3D coordinates over a wide dynamic range of light levels, from light reflected off low-reflecting objects such as black or transparent objects and high-reflecting objects such as diffuse white surfaces. Hence the 3D measuring device 1510 has important advantages in some measuring situations.

Figure 15B:
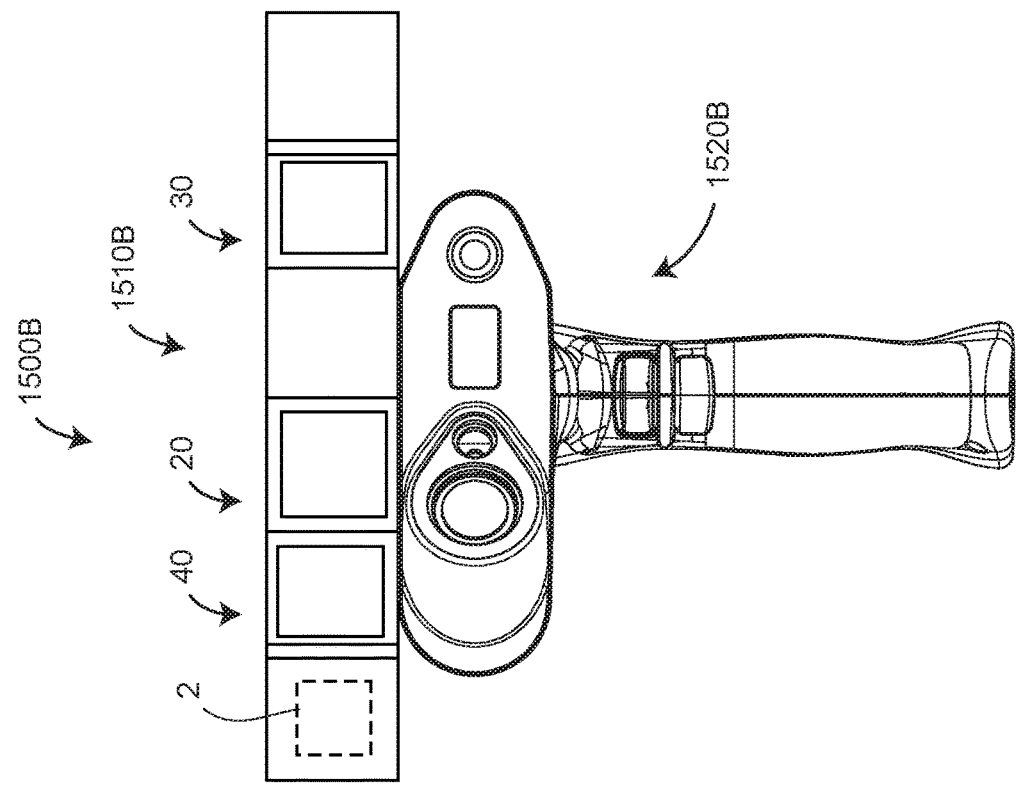
FIGS. 15B, 15C are 3D measuring devices that combine a line scanner with an area scanner according to an embodiment of the present invention.
Figure 15C:
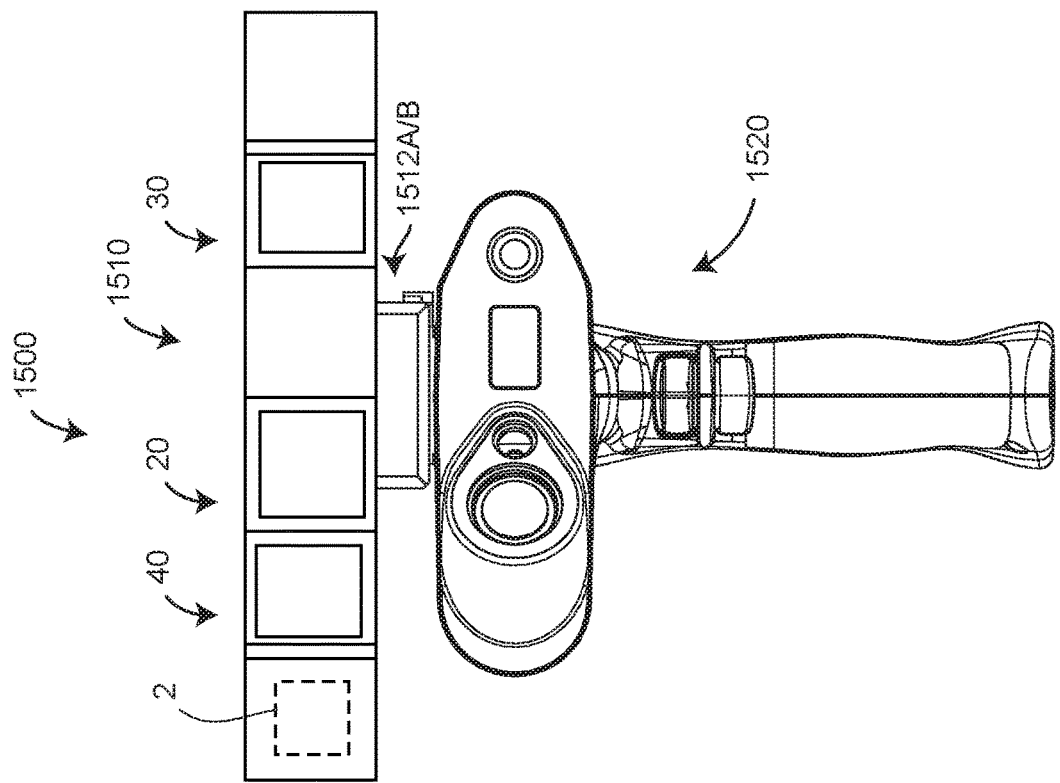

FIG. 15B is a front view of the 3D measuring device 1500, also shown in FIG. 15A. FIG. 15C is a front view of the 3D measuring device 1500B, like 1500 but without the connectors 1512A and 1512B. The 3D measuring device 1500B has advantages over the device 1500 when size of the 3D measuring device is a desired attribute.

Figure 15D:
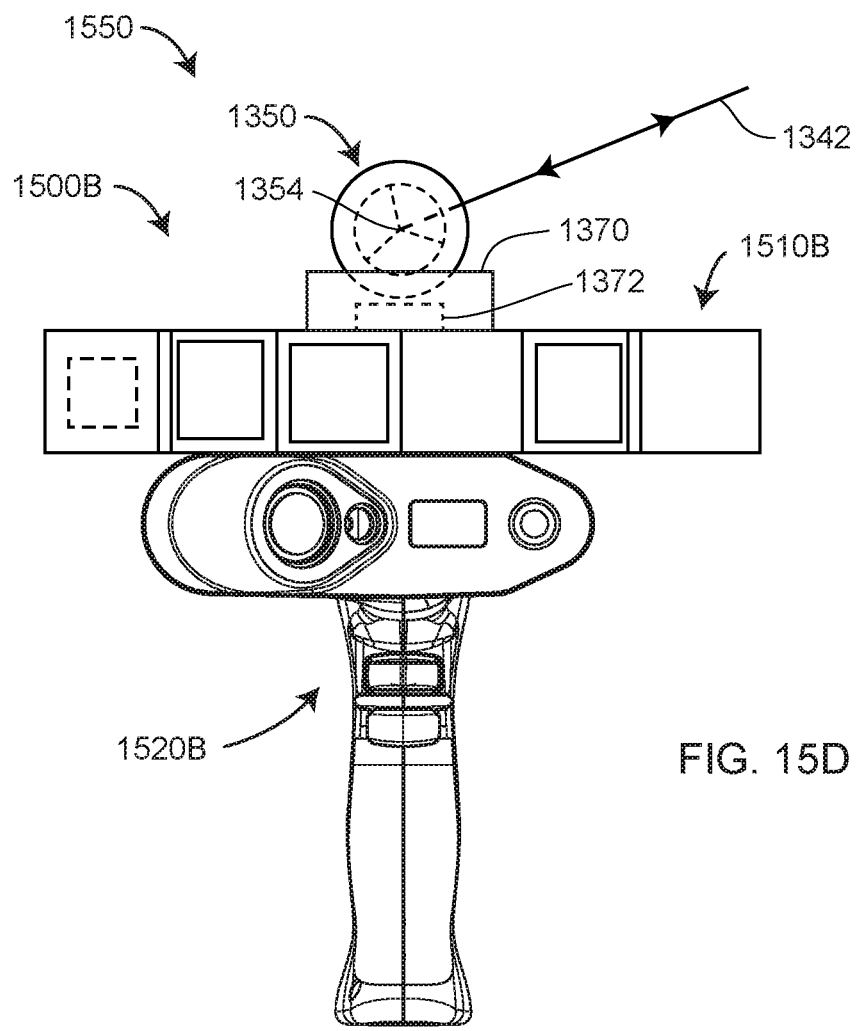
FIG. 15D is a handheld 3D measuring device tracked by a laser tracker scanner according to an embodiment of the present invention.

FIG. 15D illustrates an embodiment of a handheld 3D measuring system having a 3D measuring device 1500B described in reference to FIG. 15C, a laser tracker 1340 described in reference to FIG. 13B, SMR 1350, and magnetic nest 1370 including magnet 1372. In an embodiment, the main purpose of the laser tracker 1340, SMR 1350 and magnetic nest 1370 is to track the handheld scanner assembly in the three translational degrees of freedom (x, y, z). The main purpose of the scanner assembly 1510B is to provide three orientational degrees of freedom (pitch angle, yaw angle, and roll angle). The relatively high accuracy in both translational and orientational degrees of freedom assists in obtaining relatively high accuracy registration. The main purpose of the line scanner 1520B is to provide accurate, high dynamic range 3D coordinates, which may then be properly registered by the scanner assembly 1510B and the laser tracker 1340.

Figure 15E:
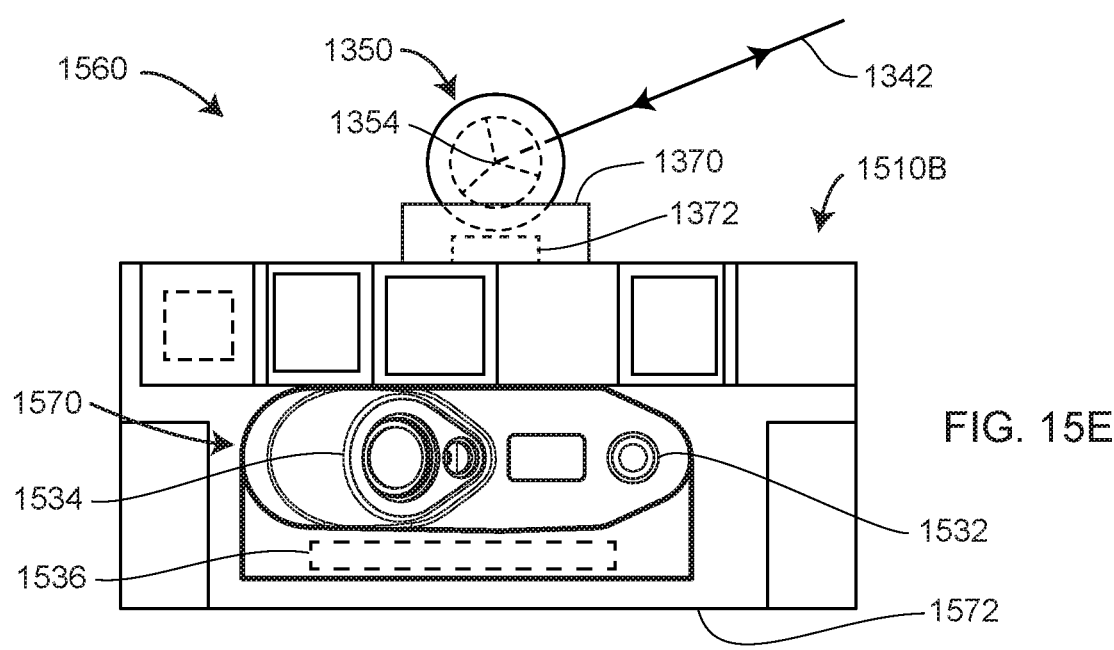
FIG. 15E is a flat-bottomed 3D measuring device tracked by a laser tracker and intended for factory automation according to an embodiment of the present invention.

FIG. 15E shows an embodiment of a 3D measuring assembly 1560, which is like the measuring assembly 1550 of FIG. 15D except that the assembly 1560 is designed for use in automated systems such as controlling or measuring with a robotic assembly or in combination with a conveyor belt. Hence the handle of the assembly 1550 has been replaced with a flat bottom 1572 in the line scanner 1570. The line scanner 1570 includes the projector 1532, the camera 1534 as described previously in reference to FIG. 15A. The line scanner 1570 may further include processing and electronics 1536.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method comprising:
providing in a scanner including a body, a projector, a first camera, a second camera, and a processing system, the projector;
at a first time, projecting from a reference plane of the projector an uncoded pattern of uncoded spots, the uncoded spots having no internal structure, the uncoded spots being projected onto an object;
at the first time, capturing the uncoded spots on the object with the first camera to obtain a first image;
at the first time, capturing the uncoded spots on the object with the second camera to obtain a second image;
with the processing system, determining three-dimensional (3D) coordinates of a first point on the object based on the uncoded spots in the reference plane, the uncoded spots in the first image and the uncoded spots in the second image, the determining not based on images obtained at times before or after the first time; and
storing the determined 3D coordinates of the first point on the object.

2. The method of claim 1 wherein:
the processing system further determines the 3D coordinates of the first point based on matching of a first uncoded spot from the first image with a second uncoded spot from the second image and a third uncoded spot from the reference plane, the first spot, the second spot, and the third spot being selected based at least in part on a nearness of intersection of a first line, a second line, and a third line, the first line being a line drawn from the selected first spot through a perspective center of the first camera, the second line being a line drawn from the selected second spot through a perspective center of the second camera, the third line being a line drawn from the selected third spot through a perspective center of the projector.

3. The method of claim 1 further comprising:
with the processing system, determining 3D coordinates of a first set of points including the first point on the object and additional points on the object, the 3D coordinates of the additional points based on the uncoded spots in the reference plane, the uncoded spots in the first image, and the uncoded spots in the second image, wherein the determining is not based on images obtained at times before or after the first time.

4. The method of claim 3 further comprising:
at a second time, projecting from the reference plane the uncoded pattern of uncoded spots, the uncoded spots being projected onto the object;
at the second time, capturing the uncoded spots on the object with the first camera to obtain a third image;
at the second time, capturing the uncoded spots on the object with the second camera to obtain a fourth image; and
with the processing system, determining 3D coordinates of a second set of points on the object based on the uncoded spots in the reference plane, the uncoded spots in the third image, and the uncoded spots in the fourth image, the determining not based on images obtained at times before or after the second time.

5. The method of claim 4 further comprising:
with the processing system, registering the first set of points and the second set of points in a common frame of reference based at least in part on the determined 3D coordinates of the first set of points and the determined 3D coordinates of the second set of points.

6. The method of claim 5 further comprising:
coupling a retroreflector to the scanner system;
with a laser tracker, measuring 3D coordinates of the retroreflector at the first time and the second time; and
with the processing system, registering the first set of points and the second set of points in a common frame of reference based at least in part on the measured 3D coordinates of the retroreflector at the first time and the measured 3D coordinates of the retroreflector at the second time.

7. The method of claim 4 further comprising:
determining with the processing system a change in pose of the scanner based at least in part on the 3D coordinates of the first set of points and the 3D coordinates of the second set of points.

8. The method of claim 7 further comprising:
coupling a retroreflector to the scanner;
measuring 3D coordinates of a retroreflector with a laser tracker at the first time and the second time; and
with the processing system, determining the change in pose of the scanner further based on the measured 3D coordinates of the retroreflector at the first time and the second time.

9. The method of claim 8 further comprising:
measuring 3D coordinates of a reference artifact with the scanner; and
with the processing system, determining the change in pose of the scanner from the first pose to the second pose further based on the measured 3D coordinates of the reference artifact.

10. The method of claim 7 further comprising:
coupling a robotic mechanism to the scanner system;
with the processing system, determining a desired change in pose of the robotic mechanism based at least in part on the determined change in pose from the first pose to the second pose; and
adjusting the robotic mechanism to obtain the desired change in pose.

11. The method of claim 10 further comprising:
changing a speed or a direction of the robotic mechanism to avoid contact with a human operator.

12. The method of claim 10 further comprising:
coupling a retroreflector to the scanner;
at the first time, measuring first 3D coordinates of the retroreflector with a laser tracker;
at the second time, measuring second 3D coordinates of the retroreflector with the laser tracker; and
with the processing system, determining a desired change in pose of the robotic mechanism further based on the measured first 3D coordinates of the retroreflector and the measured second 3D coordinates of the retroreflector.

13. The method of claim 4 further comprising:
coupling a line scanner device to the scanner, the line scanner device having a line projector and a two-dimensional (2D) line-scanner camera;

at the first time, projecting a first line of light from the line projector onto the object and capturing with the line-scanner camera a first line-scanner image of the first line of light on the object;

at the second time, projecting a second line of light from the line projector onto the object and capturing with the line-scanner camera a second line-scanner image of the second line of light on the object;

with the processing system, registering the first line of light on the object to the second line of light on the object based at least in part on the 3D coordinates of the first set of points, the 3D coordinates of the second set of points, the projected first line of light, the projected second line of light, the captured first line-scanner image, and the captured second line-scanner image.

14. The method of claim 1 further comprising:

with the projector, projecting light from a light source to a pattern generator, the pattern generator selected from the group consisting of: a diffractive optical element (DOE), a transparent or reflective slide having a pattern, a digital micromirror device (DMD), and a lenslet array.

15. The method of claim 1 further comprising:

with a beam-steering mechanism, steering the uncoded pattern of uncoded spots, the beam-steering mechanism including a solid-state deflector or a reflective element, wherein the reflective element is actuated by a mechanism selected from the group consisting of: a piezo actuator, a microelectromechanical system (MEMS) device, and a magnetic coil.

16. The set of claim 5 wherein:

the first set of points is obtained at the first time for the object on a moving conveyor belt; and the second set of points is obtained at the second time for the object on the moving conveyor belt.

17. The method of claim 5 wherein:

the first set of points is obtained at the first time for the object on a robot end effector; and the second set of points is obtained at the second time for the object on the robot end effector.

18. A system comprising:

a projector operable to project at a first time an uncoded pattern of uncoded spots from a reference plane, the uncoded spots having no internal structure, the uncoded spots being projected onto an object;

a body;

a first camera operable to capture at the first time a first image of the uncoded spots;

a second camera operable to capture at the second time a second image of the uncoded spots; and a processing system operable to determine three-dimensional (3D) coordinates of a first point on the object based on the uncoded spots in the reference plane, the first image, and the second image, the determining not based on images obtained at times before or after the first time.

19. The system of claim 18 wherein:

the processing system is further operable to determine the 3D coordinates of the first point based on matching of a first uncoded spot from the first image with a second uncoded spot from the second image and a third uncoded spot from the reference plane, the first spot, the second spot, and the third spot being selected based at least in part on a nearness of intersection of a first line, a second line, and a third line, the first line being a line drawn from the selected first spot through a perspective center of the first camera, the second line being a line drawn from the selected second spot through a perspective center of the second camera, the third line being a line drawn from the selected third spot through a perspective center of the projector.

20. The system of claim 19 wherein:

the processing system is further operable to determine 3D coordinates of a first set of points, the first set of points including the first point on the object, the first set of points further including additional points on the object, the 3D coordinates of the additional points based on the uncoded spots in the reference plane, the uncoded spots in the first image, and the uncoded spots in the second image, wherein the determining is not based on images obtained at times before or after the first time.

* * * * *